US012725329B2

(12) United States Patent
Hoffer et al.

(10) Patent No.: US 12,725,329 B2
(45) Date of Patent: Sep. 1, 2026

(54) METHOD AND SYSTEMS FOR DYNAMICALLY FEATURING ITEMS WITHIN THE STORYLINE CONTEXT OF A GRAPHIC NARRATIVE

(71) Applicant: Global Publishing Interactive, Inc., Troy, OH (US)

(72) Inventors: Robert Hoffer, Miami Beach, FL (US); Christopher Carter, Bloomingdale, IL (US); Shaun Rowan, Troy, OH (US)

(73) Assignee: GLOBAL PUBLISHING INTERACTIVE, INC., Troy, OH (US)

( * ) Notice: Subject to any disclaimer, the term of this patent is extended or adjusted under 35 U.S.C. 154(b) by 37 days.

(21) Appl. No.: 18/496,350

(22) Filed: Oct. 27, 2023

(65) Prior Publication Data

US 2025/0139858 A1 May 1, 2025

(51) Int. Cl.

*G06T 11/60* (2026.01)
*G06F 3/0483* (2013.01)
*G06T 7/12* (2017.01)

(52) U.S. Cl.

CPC ............ *G06T 11/60* (2013.01); *G06F 3/0483* (2013.01); *G06T 7/12* (2017.01); *G06T 2207/20084* (2013.01)

(58) Field of Classification Search

CPC . G06T 11/60; G06T 7/12; G06T 2207/20084; G06F 3/0483

See application file for complete search history.

(56) References Cited

U.S. PATENT DOCUMENTS 7,761,328 B2 7/2010 Kutaragi et al.
8,574,074 B2 11/2013 van Datta et al.
8,626,584 B2 1/2014 van Datta et al.
8,645,992 B2 2/2014 Russell et al.
8,676,900 B2 3/2014 Yruski et al.
8,751,310 B2 6/2014 van Datta et al.
9,129,301 B2 9/2015 van Datta et al.
9,367,862 B2 6/2016 Yruski et al.
(Continued)

FOREIGN PATENT DOCUMENTS

WO WO 2025/090165 5/2025

OTHER PUBLICATIONS

PCT Application No. PCT/US24/42943, ISR/WO dated Oct. 30, 2024.

*Primary Examiner* — Patrick F Riegler

(74) *Attorney, Agent, or Firm* — Polsinelli LLP

(57) ABSTRACT

A system and method are provided for modifying a graphic narrative to feature select products/services. Panels of the graphic narrative are segmented into elements (e.g., using semantic segmentation models like Fully Convolutional Networks), which are then identified as backgrounds, foregrounds, text bubbles, objects, characters etc. (e.g., using artificial intelligence (AI) classifiers like K-means classifiers). The identified elements are compared to a product database to select products suitable to be promoted by modifying selected elements, resulting in a version of the graphic narrative having modified panels in which the selected element(s) are changed to feature the selected products. For example, generative AI methods can redraw image elements or redraft text to place the selected products within the context of the graphic narrative. Links or watermarks can be placed in the modified panels to provide users with access to interact with or purchase the promoted products.

19 Claims, 14 Drawing Sheets

(56) References Cited

U.S. PATENT DOCUMENTS

| | | | | |
|---|---|---|---|---|
| 9,864,998 | B2 | 1/2018 | Yruski et al. | |
| 10,410,248 | B2 | 9/2019 | Yruski et al. | |
| 10,657,538 | B2 | 5/2020 | Yruski et al. | |
| 11,004,089 | B2 | 5/2021 | Yruski et al. | |
| 11,195,185 | B2 | 12/2021 | Yruski et al. | |
| 2007/0094083 | A1 | 4/2007 | Yruski et al. | |
| 2007/0094363 | A1 | 4/2007 | Yruski et al. | |
| 2007/0118425 | A1 | 5/2007 | Yruski et al. | |
| 2010/0262490 | A1* | 10/2010 | Ito | G06Q 30/02 705/14.49 |
| 2015/0212654 | A1* | 7/2015 | Beckett, Jr. | G06Q 30/0271 705/14.67 |
| 2017/0083196 | A1* | 3/2017 | Hartrell | G06N 3/084 |
| 2023/0316340 | A1* | 10/2023 | Saito | G06Q 30/0203 705/14.72 |
| 2023/0325766 | A1 | 10/2023 | Cella et al. | |
| 2025/0139895 | A1* | 5/2025 | Hoffer | G06V 10/40 |
| 2025/0148608 | A1* | 5/2025 | Hoffer | G06T 7/12 |

* cited by examiner

METHOD AND SYSTEMS FOR DYNAMICALLY FEATURING ITEMS WITHIN THE STORYLINE CONTEXT OF A GRAPHIC NARRATIVE

BACKGROUND

Graphic narratives such as comic books, manga, manhwa, and manhua are increasingly being purchased and consumed in digital formats. These digital formats of graphic narratives can be viewed on dedicated electronic reading devices (i.e., e-readers) or an electronic device (e.g., a smartphone, tablet, laptop, or desktop computer) having software for rendering the digital format of the graphic narrative on a screen of the device. The digital formats are typically provided in a single version that presents the original artwork and content of the author without modifications or interactive elements. Typically, graphic novelists are not incentivized to manually generate different versions that could be commercialized for different types of viewers.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
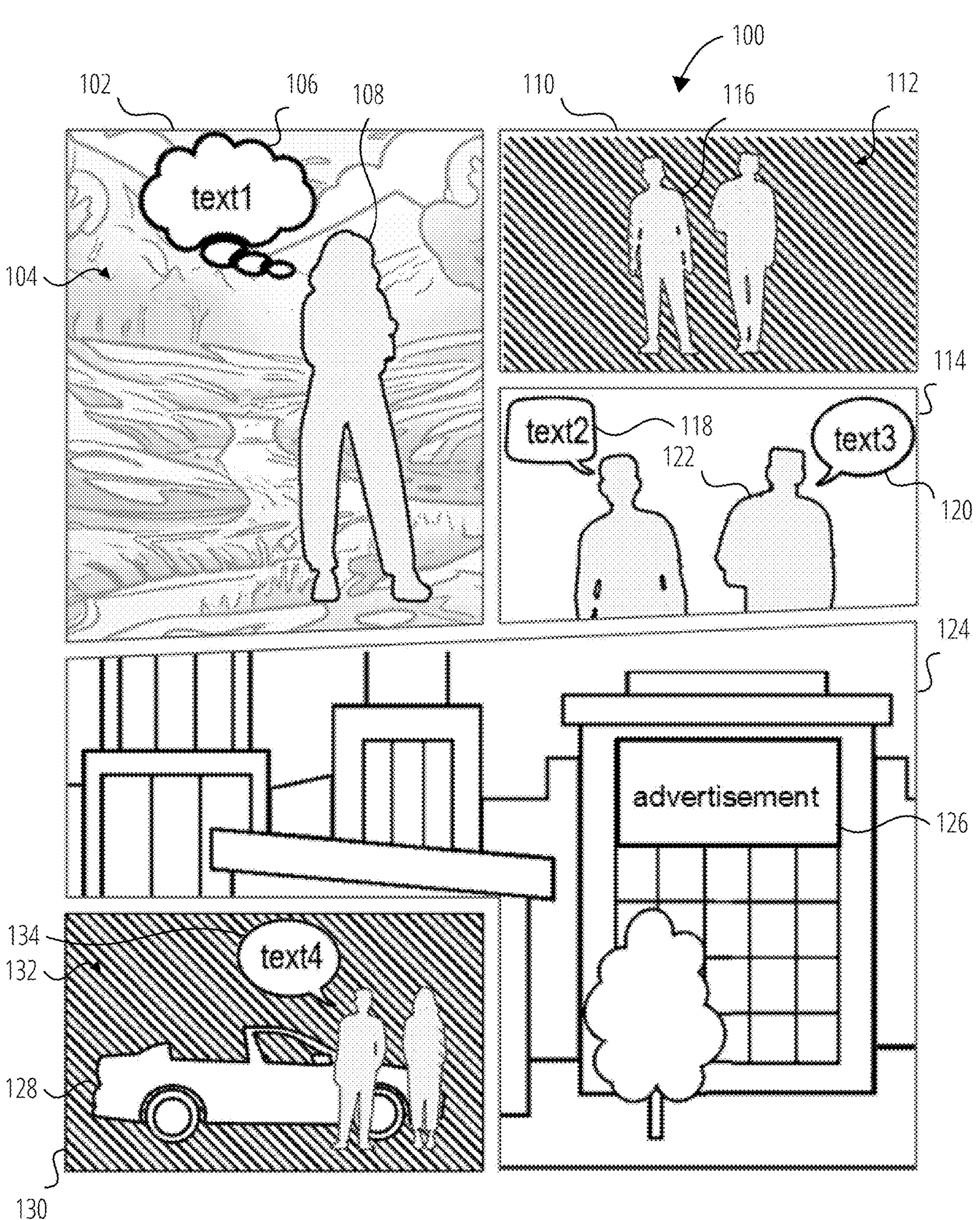
FIG. 1 illustrates an example of panels arranged in a page of a graphic narrative, in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In accordance to some aspects of the present technology, a method is provided for modifying a graphic narrative. The method includes determining edges of panels within the graphic narrative; and segmenting elements within the panels. The method further includes selecting one or more products to be featured/promoted, wherein the one or more products are to be featured/promoted at selected elements of the segmented elements, and the selected elements are within a subset of the panels; and generating a modified version of the graphic narrative in which the selected elements within the subset of the panels have been replaced by modified elements that have been modified to feature/promote the selected one or more products.

In accordance to some aspects of the present technology, the method may also include ingesting pages of the graphic narrative; slicing the pages into panels; determining a narrative flow among the panels; analyzing the segmented elements to identify objects depicted in illustration elements of the segmented elements and determining referents of text elements of the segmented elements; comparing a plurality of products to the identified objects and the determined referents to determine a degree of matching; determining featured candidates from among the plurality of products based on one or more product criteria and based on the degree of matching; selecting, from among the featured candidate, the one or more products to be featured; and providing access to one or more links to the one or more products, the links being accessed by a viewer interacting with a panel of the subset of the panels that have the modified elements.

In accordance to some aspects of the present technology, the method may also include displaying the modified version of the graphic narrative on an electronic reading device or application; displaying the modified version of the graphic narrative on a website accessed via a web browser; or printing a copy of the modified version of the graphic narrative.

In accordance to some aspects of the present technology, the method may also include that the selecting of the one or more products further includes: communicating the featured candidates to a provider of the graphic narrative, the provider being an author, illustrator, editor, or publisher of the graphic narrative; and receiving instructions from the provider indicating which of the promotion candidates are selected by the provider as the one or more products to be featured.

In accordance to some aspects of the present technology, the method may also include that the determining of the featured candidates further includes: receiving instructions from a provider indicating preferences of the provider regarding which types of products are featured in the graphic novel, the provider being an author, illustrator, editor, or publisher of the graphic narrative; and including in the one or more product criteria the preferences of the provider.

In accordance to some aspects of the present technology, the method may also include that the segmenting of elements within the panels further includes: applying a first machine learning (ML) method to a panel of the panels, the first ML method determining, within the panel, bounded regions corresponding background, foreground, text bubbles, objects, and/or characters, and identifying the bounded regions as the segmented elements.

In accordance to some aspects of the present technology, the method may also include that the first ML method is a semantic segmentation method that is selected from the group consisting of a Fully Convolutional Network (FCN) method, a U-Net method, a SegNet method, a Pyramid Scene Parsing Network (PSPNet) method, a DeepLab method, a Mask R-CNN, an Object Detection and Segmentation method, a fast R-CNN method, a faster R-CNN method, a You Only Look Once (YOLO) method, a fast R-CNN method, a PASCAL VOC method, a COCO method, a ILSVRC method, a Single Shot Detection (SSD) method, a Single Shot MultiBox Detector method, and a Vision Transformer, ViT) method.

In accordance to some aspects of the present technology, the method may also include that the analyzing of the segmented elements further includes: applying, to respective of the illustration elements, an image classifier to identify a type of an object illustrated within the respective illustration element; and applying, to respective of the text elements, a character recognition method to determine text of the respective text element and applying the text to a language model to determine one or more referents of the text.

In accordance to some aspects of the present technology, the method may also include that the image classifier is selected from the group consisting of a K-means method, an Iterative Self-Organizing Data Analysis Technique (ISODATA) method, a YOLO method. A ResNet method, a ViT method, a Contrastive Language-Image Pre-Training (CLIP) method, a convolutional neural network (CNN) method, a MobileNet method, and an EfficientNet method; and the language model is selected from the group consisting of a transformer method, a Generative pre-trained transformers (GPT), a Bidirectional Encoder Representations from Transformers (BERT) method, and a T5 method.

In accordance to some aspects of the present technology, the method may also include that the determining of the featured candidates further includes: determining, for a pair comprising an element of the segmented elements and a product of the plurality of products, a score representing a semantic similarity between the product and the identified object or the one or more referents of the element, and generating a degree of matching for the pair based on the score.

In accordance to some aspects of the present technology, the method may also include modifying the subset of the panels that have the modified elements to signal that one or more links to the featured products can be accessed by a viewer interacting with one of the subset of the panels.

In accordance to some aspects of the present technology, the method may also include that, when one of the subset of the panels is displayed to a viewer, a display device enables the viewer to accesses the one or more links by interacting with one of the subset of the panels by: clicking/selecting a region associated with one or more of the modified elements; pointing a camera of a user device to image a watermark or QR code embedded in the one of the subset of the panels; or allowing wireless communications with the user device to signal a push notification with the one or more links to the user device.

In accordance to some aspects of the present technology, a method for modifying a graphic narrative. The method includes parsing elements within respective panels of the graphic narrative; and determining promotion candidates among the parsed elements based on a degree of matching between the parsed elements and products stored in a list of products to be promoted. The method further includes selecting one or more promotion products from among the promotion candidates; and selecting one or more elements from the parsed elements, and modifying the selected one or more elements to promote the promotion products.

In accordance to some aspects of the present technology, a computing apparatus includes a processor. The computing apparatus also includes a memory storing instructions that, when executed by the processor, configure the apparatus to perform the respective steps of any one of the aspects of the above-recited methods.

In accordance to some aspects of the present technology, a computing apparatus includes a processor. The computing apparatus also includes a memory storing instructions that, when executed by the processor, configure the apparatus to determine edges of panels within respective sheets of the graphic narrative; segment elements within the panels; select one or more products to be featured, wherein the one or more products are to be featured at selected elements of the segmented elements, and the selected elements are within a subset of the panels; and generate a modified version of the graphic narrative in which the selected elements within the subset of the panels have been replaced by modified elements that have been modified to feature the selected one or more products.

In accordance to some aspects of the present technology, the non-transitory computer-readable storage medium includes instructions that when executed by a computer, cause the computer to: ingest pages of the graphic narrative; slice the pages into panels; determine a narrative flow among the panels; analyze the segmented elements to identify objects depicted in illustration elements and determine referents of text elements; compare a plurality of products to the identified objects and the determined referents to determine a degree of matching; determine candidate products from among the plurality of products based on one or more product criteria and based on the degree of matching; select, from among the candidate products, the one or more products to be featured; and providing access to one or more links to the one or more products, the links being accessed by a viewer interacting with a panel of the subset of the panels that have the modified elements.

In accordance to some aspects of the present technology, the non-transitory computer-readable storage medium includes instructions that when executed by a computer, cause the computer to: display the modified version of the graphic narrative on an electronic reading device or application; display the modified version of the graphic narrative on a website accessed via a web browser; or print a copy of the modified version of the graphic narrative.

In accordance to some aspects of the present technology, the non-transitory computer-readable storage medium includes instructions that when executed by a computer, cause the computer to: apply a first machine learning (ML) method to a panel of the panels, the first ML method determining, within the panel, bounded regions corresponding to a background, a foreground, text bubbles, objects, and/or characters, and identifying the bounded regions as the segmented elements.

In accordance to some aspects of the present technology, the non-transitory computer-readable storage medium includes instructions that when executed by a computer, cause the computer to: apply, to respective of the illustration elements, an image classifier to identify a type of an object illustrated within the respective illustration element; and apply, to respective of the text elements, a character recognition method to determine text of the respective text element and applying the text to a language model to determine one or more referents of the text.

In accordance to some aspects of the present technology, the non-transitory computer-readable storage medium includes instructions wherein the image classifier is selected from the group consisting of a K-means method, an Iterative Self-Organizing Data Analysis Technique (ISODATA) method, a YOLO method. A ResNet method, a ViT method, a Contrastive Language-Image Pre-Training (CLIP) method, a convolutional neural network (CNN) method, a MobileNet method, and an EfficientNet method; and the language model is selected from the group consisting of a transformer method, a Generative pre-trained transformers (GPT), a Bidirectional Encoder Representations from Transformers (BERT) method, and a T5 method.

In accordance to some aspects of the present technology, the non-transitory computer-readable storage medium includes instructions that when executed by a computer, cause the computer to: control a display of a viewing device to display one of the subset of the panels, and enable a viewer to accesses one or more links by interacting with the one of the subset of the panels by: selecting a region associated with one or more of the modified elements; pointing a camera of a user device to image a watermark embedded in the one of the subset of the panels; or allowing wireless communications with the user device to signal a push notification with the one or more links to the user device.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for modifying digital versions of graphic narratives to take advantage of advancements in technologies. For example, these modifications can make the user experience more interactive and/or can feature products/services within the narrative context of the graphic narrative and provide the viewer with interactive opportunities to select, interact with, or purchase the featured products/services.

The digital format provides untapped opportunities to make the user experience more immersive and interactive. The current presentation of graphic narratives in digital format is largely the same as for print media and fails to take advantage of advances in other areas of technology such as artificial intelligence (AI) and machine learning (ML). For example, advances in generative AI technologies have opened to door to machine-generated images. Further, advances in large language models (LLMs) such as CHA-GPT have opened the door to machine-generated text. Moreover, embed links or QR codes are used in documents in other fields to allow viewers to access additional content that is related to the content that is presented in the document itself. In contrast, digital versions of graphic narratives generally present the original artwork and content of the author without modifications or interactive elements.

Accordingly, the disclosed technology addresses the need in the art for adapting the digital versions of graphic narratives by taking advantage of advancements in technologies to make the user experience more interactive and/or to feature items/products/services within the context of the graphic narrative and provide the viewer with interactive opportunities to interact with or purchase the featured items/products/services.

The methods and systems disclosed herein provide improvements in the area of digital and printed versions of graphic narratives (e.g., comic books). For example, the methods and systems disclosed herein allow the images and/or text in the graphic narrative to be modified to feature various items/products in which a viewer might be interested. According to certain non-limiting examples, the images and/or text can be modified using generative AI methods or techniques. Additionally, the graphic narrative may include embedded links or watermarks that allow a viewer who is interested in the featured items/products to access a website or popup window that provides additional information about the featured items/products. In some cases, the graphic narrative may include embedded links or watermarks that allow a viewer to interact with the items/products or to purchase the featured items/products. Because the items/products are featured seamlessly within the context of the graphic narrative, they can be featured without distracting from the narrative and can provide viewers with an additional dimension to their viewing experience, as well as providing vendors another mechanism for engaging potential patrons/customers of their products/services.

The interactive nature of the featured product can result from embedded links or watermarks. For example, in a printed graphic narrative, a watermark (e.g., a QR code or other embedded image/pattern) that is invisible to the eye but can nevertheless be detected by a digital scanner or camera device (e.g., the camera on a smartphone) can be provided to allow viewers to access additional content related to the featured items. Panels with watermarks can be indicated using a different border than normal panels, signaling to viewers that additional content is accessible using the camera on their smartphone. Similarly, digital renderings of the graphic narrative can also include panels with indicia (e.g., a different border) signaling to the viewer that the panel has interactive content that can be accessed by clicking, tapping, or some other user input, for example.

In addition, display of the featured items can be dynamic. For example, a viewer can opt into or opt out of having the featured items be displayed within the context of the graphic narrative. Furthermore, the version of the featured item that is displayed in the graphic narrative may change in response to the viewer's selections or preferences. For example, the viewer may indicate in their preferences that they do not want featured items, or that they do but limited to a preference that is associated with a teenager. Additionally, the viewer can provide indications of what specific types of featured items they would like to see and receive offers for. In some cases, the selection of featured items can be based on other information regarding the types of products in which the viewer is interested (e.g., based on their shopping and search histories).

The methods and systems disclosed herein can provide various data streams indicating the viewer's preferences and interests to a recommender system. Based on such inputs, the recommender system may then provide recommendations regarding which products (e.g., selected from a product database) would be suitable to feature within the context of the graphic narrative. When considering which products would be suitable within the flow of the graphic narrative, the recommender system can account for the subject matter of the graphic narrative, as well as the viewer's preferences and interests.

FIG. 1 illustrates an example of panels arranged in a page of a graphic narrative, in accordance with some aspects of the present technology. Although FIG. 1 illustrates one arrangement of features, other arrangements and other features are contemplated by the present technology. FIG. 1 should not be considered limiting of the present technology unless specifically recited in the appended claims.

Specifically, FIG. 1 illustrates a page 100 from a graphic narrative (e.g., a comic book, manga, manhwa, manhua, anime, animated moving picture, etc.). The page 100 includes five panels (i.e., a first panel 102, a second panel 110, a third panel 114, a fourth panel 124, and a fifth panel 130). The respective panels can be segmented into parts, including, e.g., a background, a foreground, and bubbles. These parts can be further subdivided into elements, such as characters, objects, text, signs, etc. For example, the first panel 102 includes the background 104, the foreground 108, and the bubble 106. Similarly, second panel 110 includes the background 112 and the foreground 116, and the third panel 114 102 includes the foreground 122, the bubble 118, and the bubble 120. The fourth panel 124 includes a background that has a text sign 126, The fifth panel 130 includes the foreground 128, the background 132, and the bubble 134.

The system and method disclosed herein provide a contextual promotion and advertising of products (and/or services) by providing images and/or references to the products within the narrative flow of the graphic narrative. Further, the system and method disclosed herein can provide a mechanism within the graphic narrative for a viewer of the graphic narrative to purchase the products or receive offers regarding the products. The products or services promoted in the graphic narrative can include, e.g., consumer products, clothing, electronics, applications, subscriptions, memberships, etc.

The products can be promoted by modifying text in the graphic narrative or images in the graphic narrative to refer to or feature the products. For example, text can be modified to integrate a product in dialogue between characters in the graphic narrative. For example, a comic book about teenage girls can include a storyline in which a group of teenage girls are going shopping at a mall and decide to buy matching shoes. A particular brand of shoes can be featured/promoted by modifying the dialog such that the group of teenage girls decides to buy the particular brand of shoes. The modifications to the dialog can be made to be consistent with the storyline, such that the modifications do not disrupt of flow of the storyline. Further, the font and style of the text can be adapted to be consistent with the style of graphic narrative. This can be achieved by using a generative artificial intelligence (AI) method to learn a style of the author/artist of the graphic narrative, and generating the modifications in the same style as the author/artist.

Additionally, the images within the graphic narrative can be modified to show the characters using or interacting with the product. In the above example of the comic book about teenage girls, the images in the storyline can be modified such that the shoes worn by the teenage girls are those of the particular brand of shoes. In some cases, metadata associated with various foreground elements may be stored to denote when the product is to replace the original foreground element. For example, not all shoes shown in the graphic narrative should be replaced by the particular brand of shoes, only those shoes that the teenage girls buy together at the mall.

The modified images can be achieved by using a generative AI method that learns a style of the author/artist of the graphic narrative and generates modified images in the same style as the author/artist. Further, the modified images can be presented to the author/artist who may further edit the modified images if further editing is beneficial or requested.

In some cases, text and images can be modified in the background as well as in the foreground of the graphic narrative. For example, the background can be a cityscape that includes advertising billboards. The text or images in the advertising billboards can be modified to feature the promoted products.

Additional modifications to graphic narrative can include modifying the formatting of panels to adapt them from a comic book format (or other graphic narrative format) to a format that is compatible with being displayed in an electronic reader (e-reader), a reader application, or in a webpage. For example, on page 100, the size and shape of the panels are not uniform (e.g., some panels are not even rectangular). Further, on page 100, the trajectory of the viewer's eye when following the narrative is not a straight line. The panels can be reformatted so that they can be more uniform in shape and so that they be scrolled either vertically or horizontally in an e-reader, for example. To make the panels more uniform in shape and size, a generative AI method can be used to fill in missing portions of the background and/or foreground.

Figure 2A:
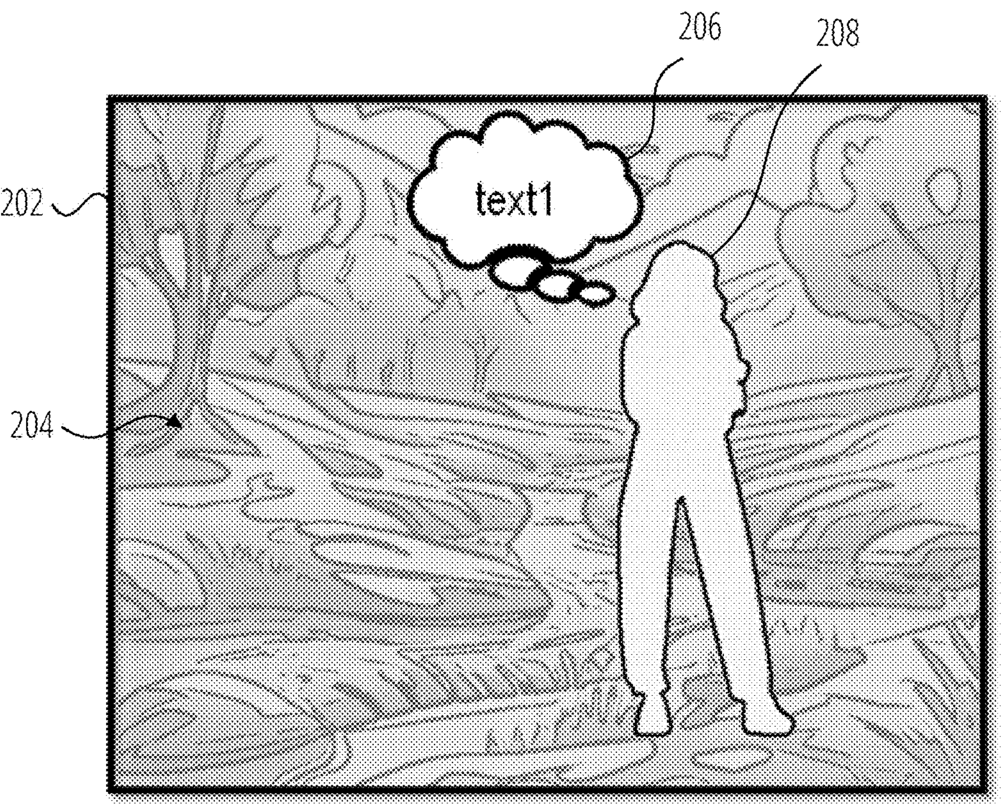
FIG. 2A illustrates a first example of a modified first panel, in accordance with some aspects of the present technology.

FIG. 2A illustrates a first example of a modified first panel, in accordance with some aspects of the present technology. Although FIG. 2A illustrates one arrangement of features, other arrangements and other features are contemplated by the present technology. FIG. 2A should not be considered limiting of the present technology unless specifically recited in the appended claims.

FIG. 2A illustrates a first example of the modified first panel 202, which includes a background 204, a bubble 206, and a foreground 208. Here, the background 204 is expanded by adding additional background on the left and right sides, and this additional background is generated in the style of the artist. For example, the additional background can be generated by a generative AI method that has been trained in the style of the artist. Here, the text bubble 206 is a thought bubble, and the text in bubble 206 is not changed relative to the text in bubble 106.

Figure 2B:
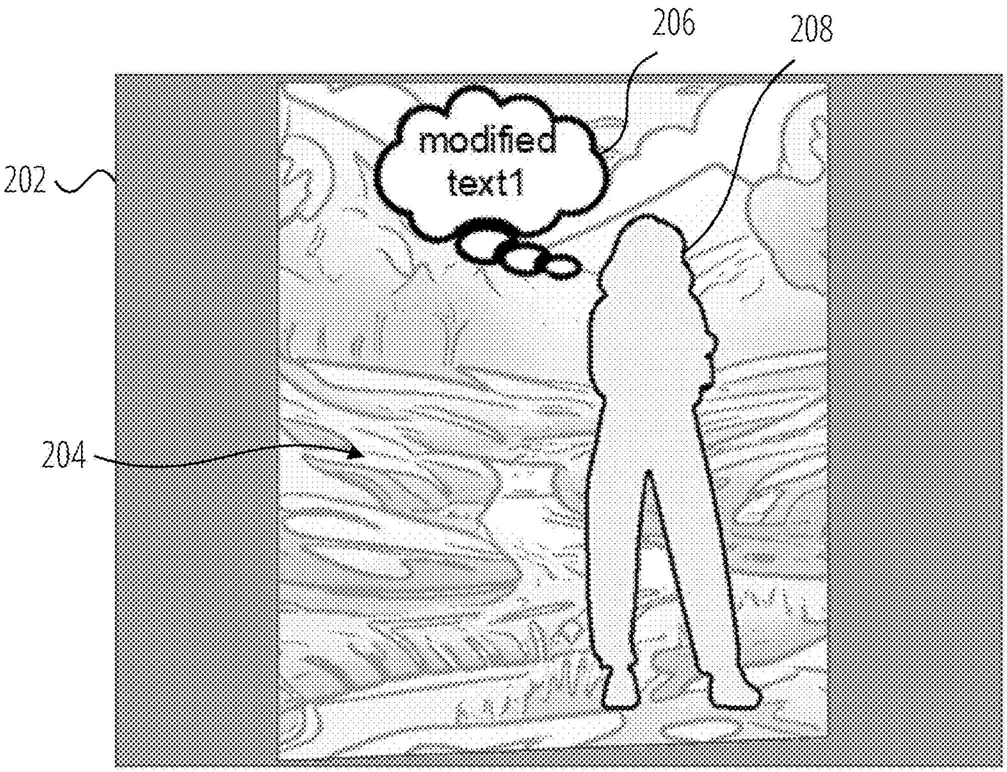
FIG. 2B illustrates a second example of the modified first panel, in accordance with some aspects of the present technology.

FIG. 2B illustrates a second example of the modified first panel, in accordance with some aspects of the present technology. Although FIG. 2B illustrates one arrangement of features, other arrangements and other features are contemplated by the present technology. FIG. 2B should not be considered limiting of the present technology unless specifically recited in the appended claims.

FIG. 2B illustrates a second example of the modified first panel 202, which includes a background 204, a bubble 206, and a foreground 208. Here, the background 204 remains the same the background 104 as in FIG. 1, but a border is added to make the panel 202 the desired rectangular shape and size to make it compatible for being displayed in an e-reader, for example. The text "modified text1" in bubble 206 is changed relative to the text "text1" in bubble 106. The change in the text can be made using generative AI, and the "modified text1" can include changes that feature a product, for example.

Figure 2C:
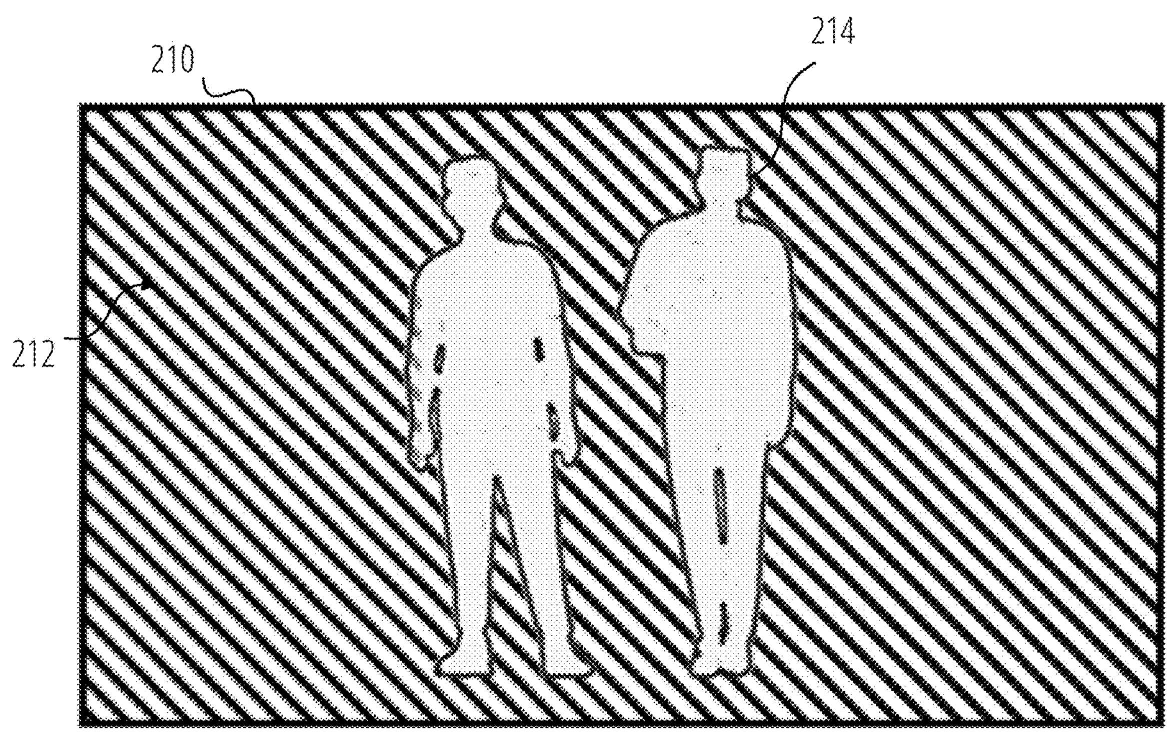
FIG. 2C illustrates an example of a second panel, in accordance with some aspects of the present technology.

FIG. 2C illustrates an example of a modified second panel, in accordance with some aspects of the present technology. Although FIG. 2C illustrates one arrangement of features, other arrangements and other features are contemplated by the present technology. FIG. 2C should not be considered limiting of the present technology unless specifically recited in the appended claims.

FIG. 2C illustrates an example of the second panel 210, which includes a background 212 and a foreground 214. In some cases, the modified second panel 210 does not include any changes. Not all of the panels will necessarily be modified for each version of the graphic narrative. In an alternative example, the background 212 and/or the foreground 214 can be changed to promote the product. For example, one or both of the characters in the foreground 214 can have their clothing modified to promote a particular brand of clothing. When segmenting the foreground 214, different objects and characters can be separated into distinct segments of the foreground. For example, the foreground 214 may separate out a top garment item and a bottom garment item from a body. Similarly, the background can be segmented into separate objects and elements.

Figure 2D:
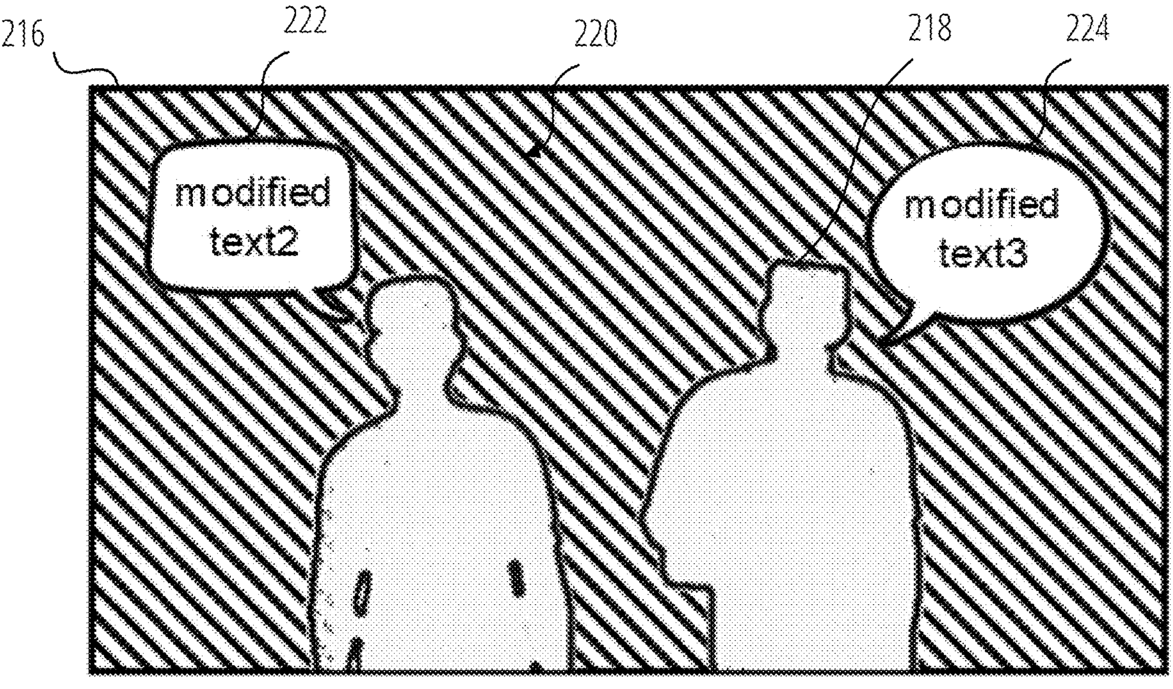
FIG. 2D illustrates an example of a modified third panel, in accordance with some aspects of the present technology.

FIG. 2D illustrates an example of a modified third panel, in accordance with some aspects of the present technology. Although FIG. 2D illustrates one arrangement of features, other arrangements and other features are contemplated by the present technology. FIG. 2D should not be considered limiting of the present technology unless specifically recited in the appended claims.

FIG. 2D illustrates an example of the modified third panel 216, which includes a background 220, a foreground 218, a bubble 222, and a bubble 224. According to certain non-limiting examples, the dialog in bubble 222 and bubble 224 are respectively modified relative to their counterparts in the third panel 114 of FIG. 1. The modifications to the dialog can be made to be consistent with the storyline, such that the modifications do not disrupt of flow of the storyline. Further, the font and style of the text can be adapted to be consistent with the style of graphic narrative. This can be achieved by using a generative artificial intelligence (AI) method to learn the style of the author/artist of the graphic narrative, and generating the modifications in the same style as the author/artist. For example, the modified text2 and modified text3 may add or change a reference to an outfit choice that includes the product.

Figure 2E:
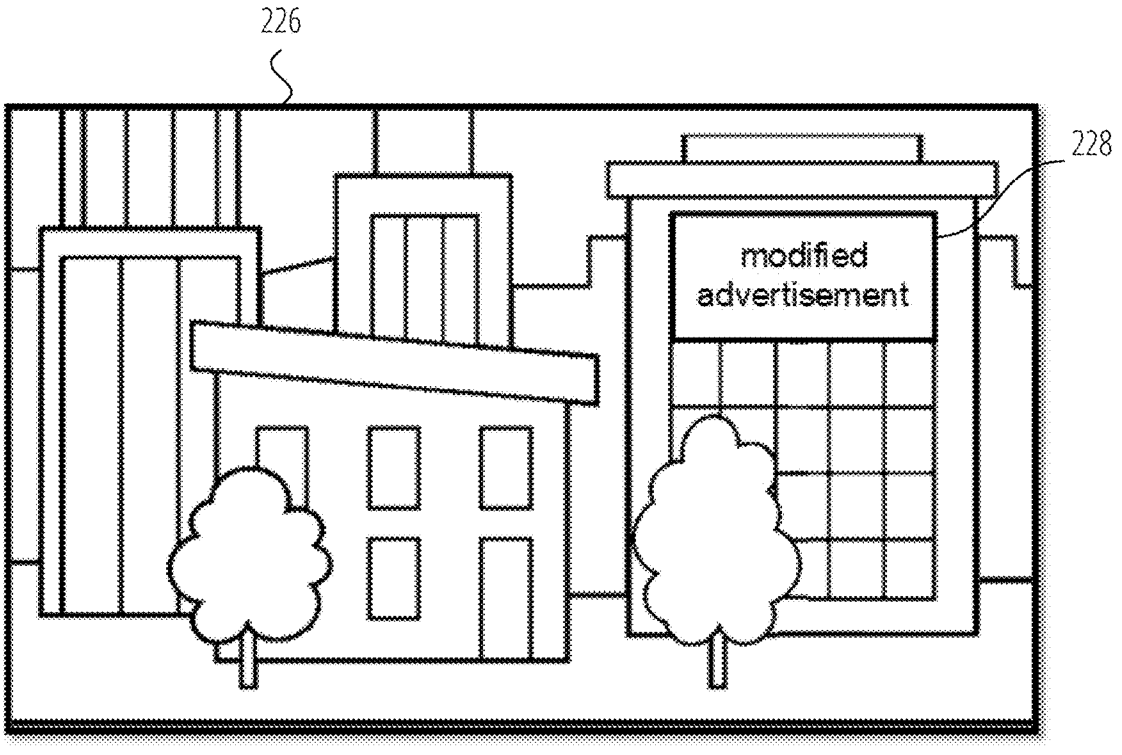
FIG. 2E illustrates a first example of a modified fourth panel, in accordance with some aspects of the present technology.

FIG. 2E illustrates a first example of a modified fourth panel, in accordance with some aspects of the present technology. Although FIG. 2E illustrates one arrangement of features, other arrangements and other features are contemplated by the present technology. FIG. 2E should not be considered limiting of the present technology unless specifically recited in the appended claims.

FIG. 2E illustrates an example of the modified fourth panel 226, which includes a text sign 228 that has been modified relative to the counterpart in the fourth panel 124 of FIG. 1. The text sign 228 is part of the background 226, and the text sign 228 includes an advertisement. In the text sign 228, the advertisement has been modified to promote a particular product. Furthermore, the background 226 has been expanded by adding additional background on the bottom left corner, and this additional background is generated in the style of the artist. For example, the additional background can be generated by a generative AI method that has been trained in the style of the artist.

Figure 2F:
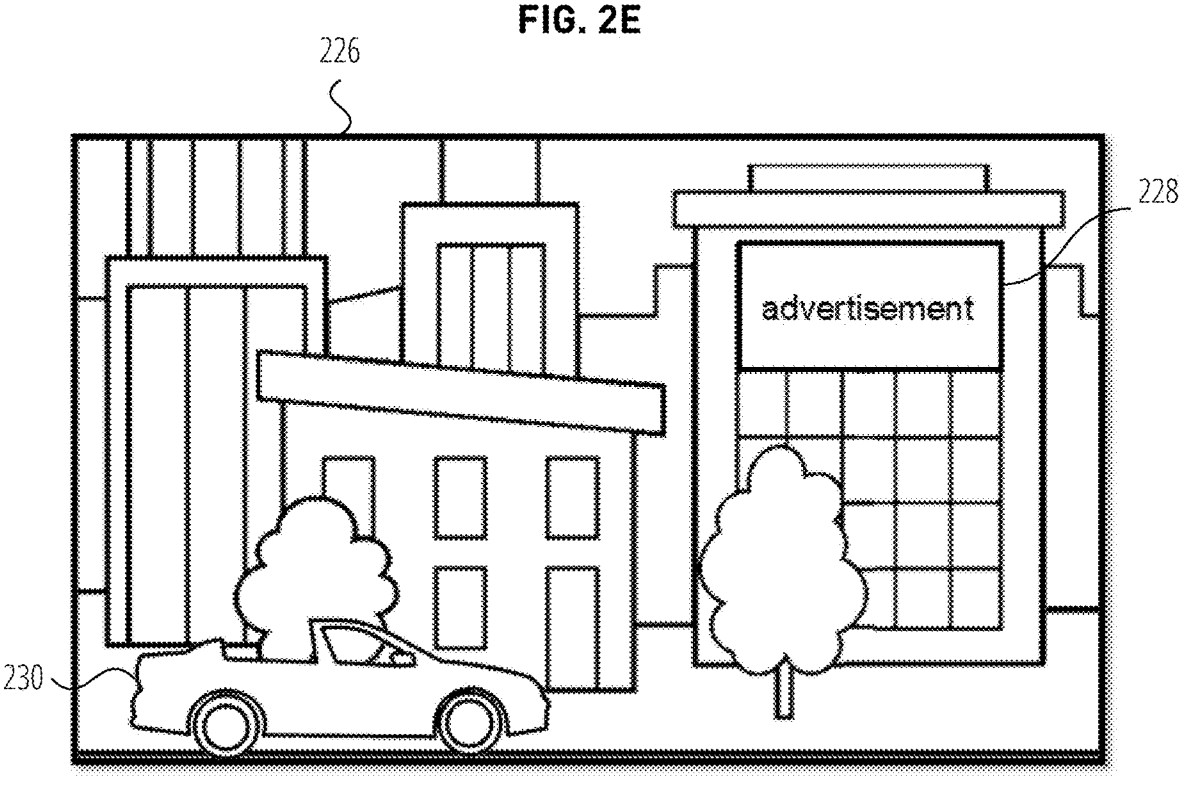
FIG. 2F illustrates a second example of a modified fourth panel, in accordance with some aspects of the present technology.

FIG. 2F illustrates a second example of a modified fourth panel, in accordance with some aspects of the present technology. Although FIG. 2F illustrates one arrangement of features, other arrangements and other features are contemplated by the present technology. FIG. 2F should not be considered limiting of the present technology unless specifically recited in the appended claims.

FIG. 2F illustrates an example of the modified fourth panel 226, which includes a text sign 228 has not been modified relative to the counterpart in the fourth panel 124 of FIG. 1. Foreground 230, however, has been added to promote a particular product, such as an automobile. The modified image can be achieved by using a generative AI method that learns the style of the author/artist, and generates a modified image in which an element or portion of the image in the panels is redrawn in the style as the author/artist to contextually place the particular product within the graphic narrative.

Figure 2G:
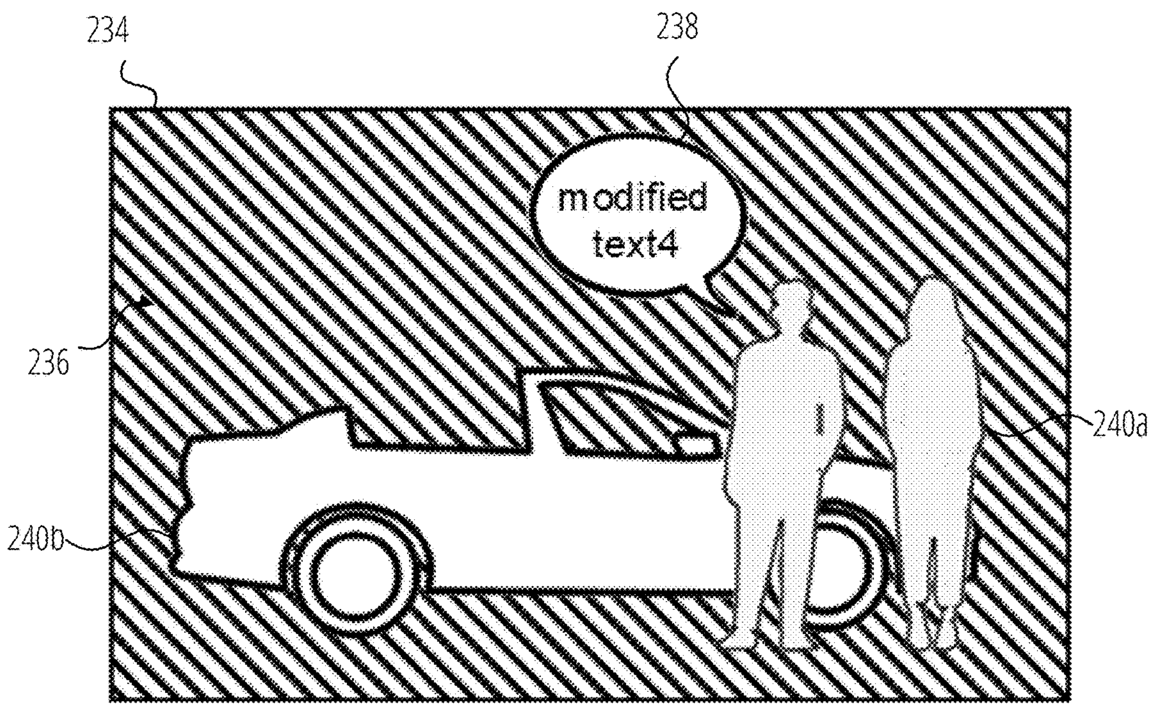
FIG. 2G illustrates a first example of a modified fifth panel, in accordance with some aspects of the present technology.

FIG. 2G illustrates a first example of a modified fifth panel, in accordance with some aspects of the present technology. Although FIG. 2G illustrates one arrangement of features, other arrangements and other features are contemplated by the present technology. FIG. 2G should not be considered limiting of the present technology unless specifically recited in the appended claims.

FIG. 2G illustrates an example of the modified fifth panel 234, which includes a background 236, a first foreground 240*a*, a second foreground 240*b*, and the bubble 238. Here, the bubble 238 is modified to promote a particular product relative to the counterpart in the fifth panel 130 of FIG. 1.

Figure 2H:
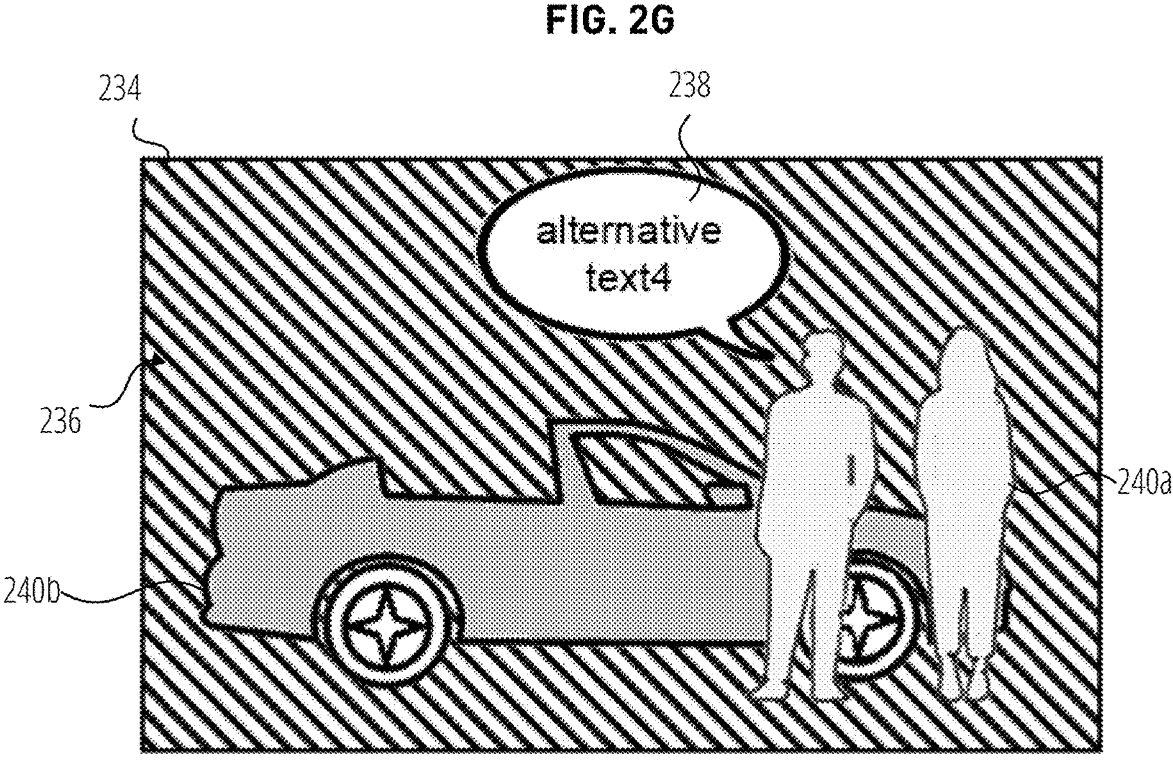
FIG. 2H illustrates a second example of a modified fifth panel, in accordance with some aspects of the present technology.

FIG. 2H illustrates a second example of a modified fifth panel, in accordance with some aspects of the present technology. Although FIG. 2H illustrates one arrangement of features, other arrangements and other features are contemplated by the present technology. FIG. 2H should not be considered limiting of the present technology unless specifically recited in the appended claims.

FIG. 2H illustrates an example of the modified fifth panel 234, which includes a background 236, a first foreground 240*a*, a second foreground 240*b*, and the bubble 238. Here, in addition the modified bubble 238, the foreground 240*b* is an automobile and modified to promote a particular color the automobile and a different style of hubcaps, for example. The change is relative to the counterpart in the fifth panel 130 of FIG. 1

Figure 3A:
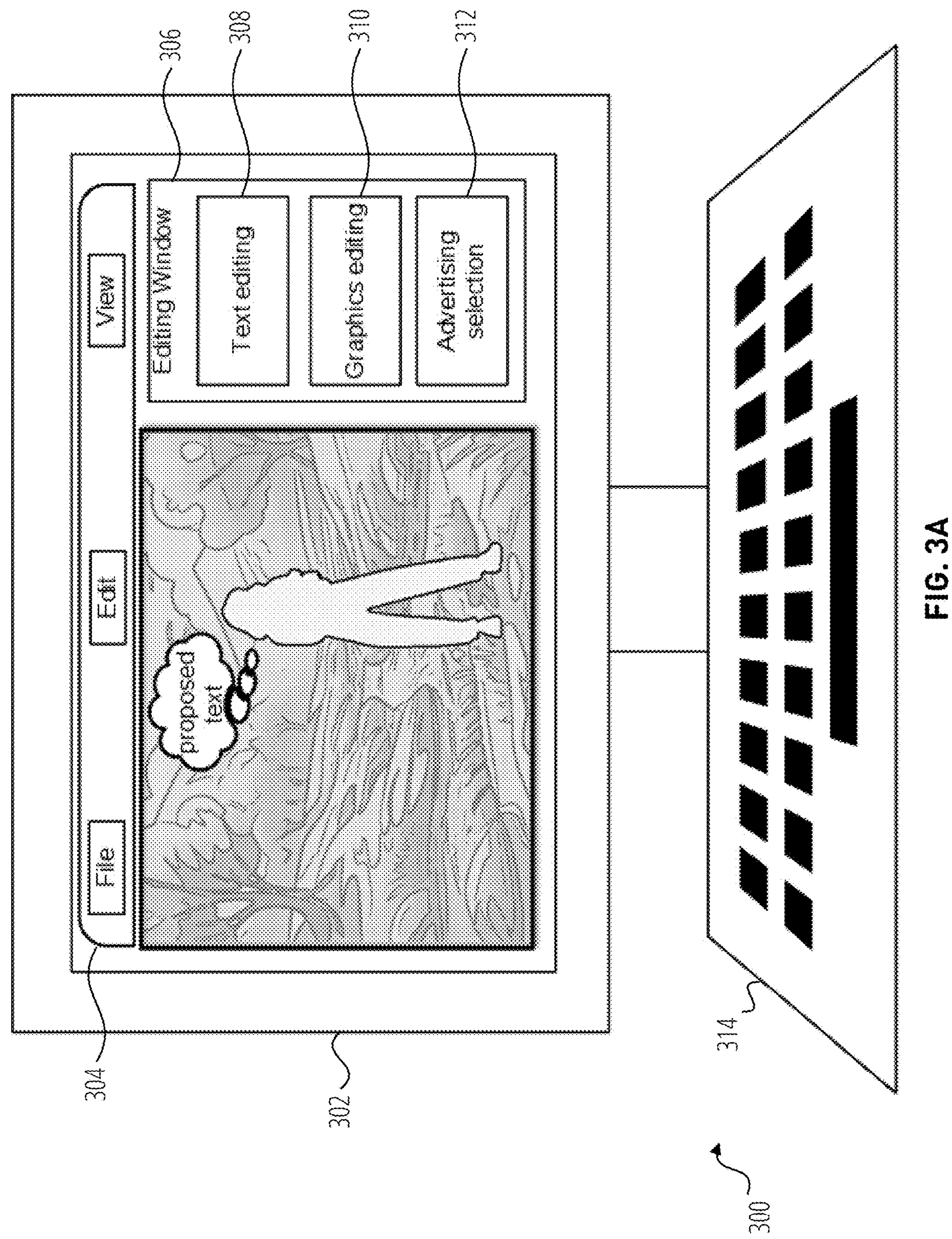
FIG. 3A illustrates an example of a desktop computing device for editing and/or viewing a modified graphic narrative, in accordance with some aspects of the present technology.

FIG. 3A illustrates a computing system 300 for modifying the graphic narrative to promote particular products and to provide a desired format for printing the modified graphic narrative or displaying the modified graphic narrative on a screen of a user device. The computing system 300 includes a display 302 (e.g., a computer monitor) and an input device 314 (e.g., a mouse and/or keyboard). The display 302 displays a window that includes a current version of a modified panel, a menu ribbon 304, and an editing window 306. The current version of a modified pane can include AI generated modifications to the text and/or the image. The menu ribbon 304 can provide options for changing a view, changing editing tools, saving a file, etc.

The editing window 306 can include a text editor 308, an image editor 310, and a product selector 312. The text editor 308 can allow an author or editor of the graphic narrative to make changes to the text, including portions of the text that were generated using generative AI. The image editor 310 can allow the author or editor to make changes to the images, including portions of the images that were generated using generative AI, for example. The product selector 312 can allow an author or editor to select one or more products to be promoted from a list of proposed products. For example, the list of proposed products can be generated by an AI method based on comparing the subject matter of the graphic narrative (e.g., the identified objects in the segmented elements within the panels of the graphic narrative) with a product database to determine which products in the database are suitable/compatible with being placed in the context of the graphic narrative.

Figure 3B:
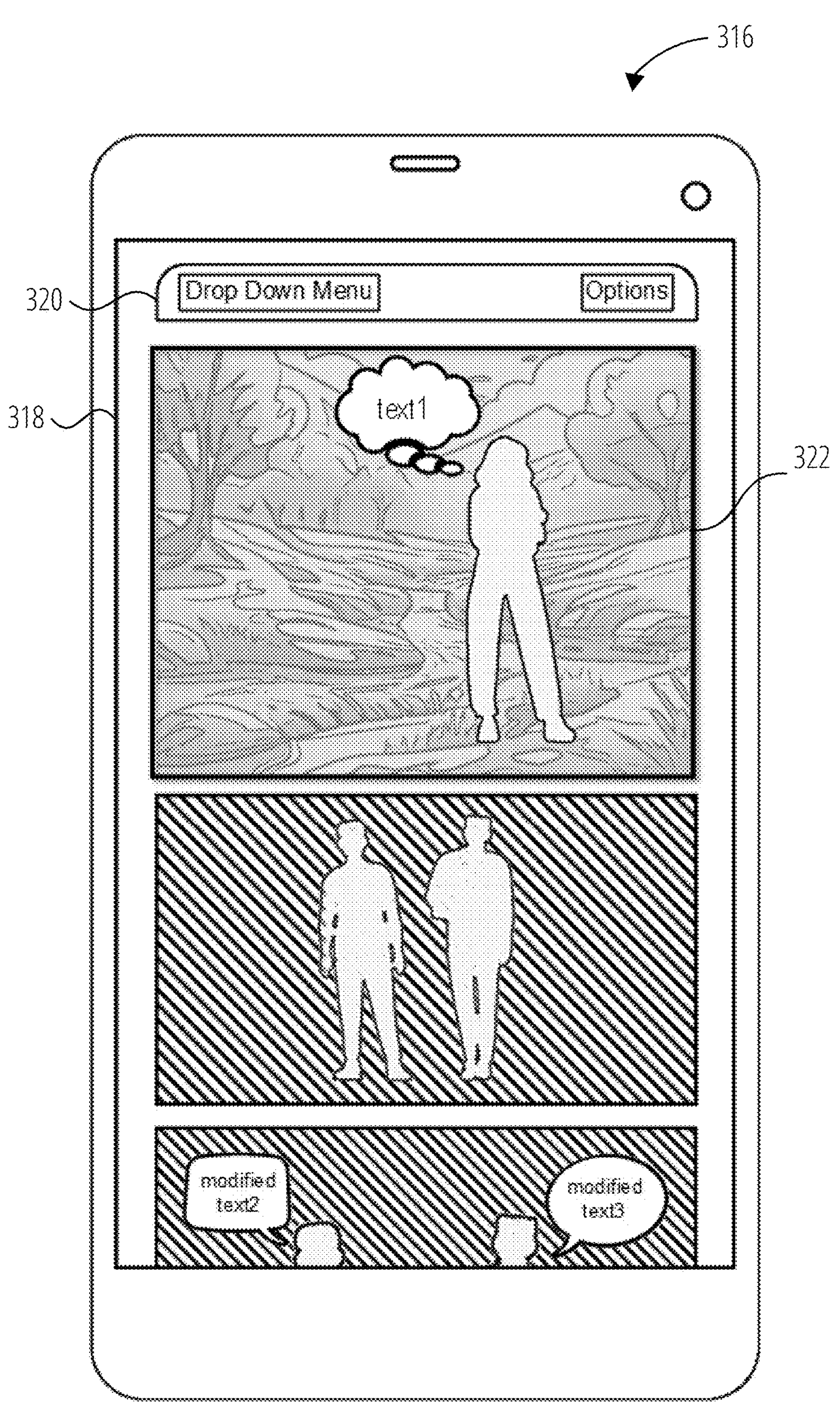
FIG. 3B illustrates an example of a handheld computing device for viewing the modified graphic narrative, in accordance with some aspects of the present technology.

FIG. 3B illustrates a mobile device 316 for displaying the modified graphic narrative within a 318. According to certain non-limiting examples, the mobile device 316 includes a menu ribbon 320 that allows a viewer to change the display settings or customize the viewing experience using various drop-down menus and/or options menus. The mobile device 316 can be an e-reader that allows the viewer to scroll through the panels vertically or horizontally. The mobile device 316 can be a user device such as a smartphone, a tablet, or a computer on which an application or software is installed that provides a multi-modal viewing experience by allowing the viewer to view the panels arranged vertically, horizontally, or as a double paged spread. In some cases, a viewer can view the graphic narrative using web browser displayed on a monitor or display of a computer. The web browser can be used to access a website or content provider that displays the modified graphic narrative within the web browser or an application of the content provider.

Figure 4:
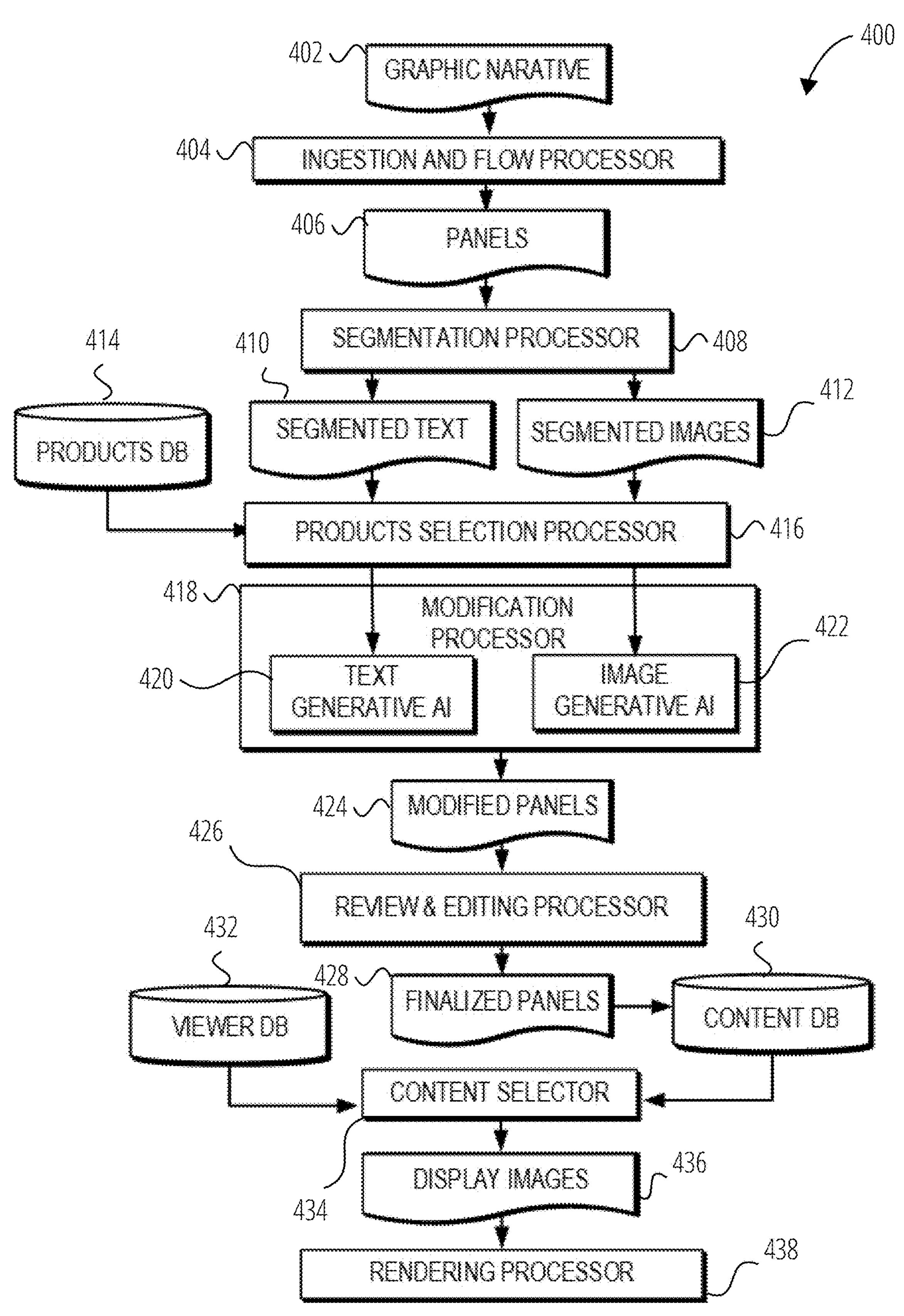
FIG. 4 illustrates an example of a block diagram for a system of generating the modified graphic narrative, in accordance with some aspects of the present technology.

FIG. 4 illustrates an example of a block diagram for a system of generating the modified graphic narrative, in accordance with some aspects of the present technology. Although example block diagram 400 depicts a particular sequence of operations, the sequence may be altered without departing from the scope of the present disclosure. For example, some of the operations depicted may be performed in parallel or in a different sequence that does not materially affect the function of method. In other examples, different components of an example device or system that implements the method may perform functions at substantially the same time or in a specific sequence.

The graphic narrative 402 is received by an ingestion and flow processor 404, which ingests a digital version of the graphic narrative 402. The digital versions may be generated from graphics editing software or by scanning physical pages of the graphic narrative. The digital version can be a Portable Document Format (PDF) file or another file extension type. The ingestion and flow processor 404 identifies respective areas and boundaries for each of the panels. For example, the ingestion and flow processor 404 can identify the edges of the panels and where the panels flow over or extend beyond nominal boundaries. The ingestion and flow processor 404 determines an order in which the storyline flows from one panel to another, resulting in an ordered set of panels 406, including definitions or boundaries for what constitutes the extent of each of the panels.

The segmentation processor 408 receives the panels 406 and generates therefrom segmented elements, including segmented text 410 and segmented images 412. As discussed above, the segmented text 410 can include text in various types of bubbles, as well as other text appearing in the panels 406, such as onomatopoeia, text blocks, and narration.

The text can be in any of multiple different formats, including text in speech bubbles, thought bubbles, narrative boxes, exposition, onomatopoeia (e.g., "wow," "pow," and "zip"), text appearing in the background (e.g., on signs or on objects). Further, the text can be in various sizes and fonts or can even be hand-lettered text.

The panels can be segmented using various methods and techniques, such as semantic segmentation models, which include Fully Convolutional Network (FCN) methods, U-Net methods, SegNet methods, a Pyramid Scene Parsing Network (PSPNet) methods, and DeepLab methods. The segmentation processor 408 can also segment the panels 406 using image segmentation models, such as Mask R-CNN, GrabCut, and OpenCV. The segmentation processor 408 can also segment the panels 406 using Object Detection and Image Segmentation methods, such as fast R-CNN methods, faster R-CNN methods, You Only Look Once (YOLO) methods, PASCAL VOC methods, COCO methods, and ILSVRC methods. The segmentation processor 408 can also segment the panels 406 using Single Shot Detection (SSD) models, such as Single Shot MultiBox Detector methods. The segmentation processor 408 can also segment the panels 406 using detection transformer (DETR) models such as Vision Transformer (ViT) methods.

Many of the above methods identify the objects within the segmented elements, but, for other segmentation methods, a separate step is used to identify the object depicted in the segmented elements. This identification step can be performed using a classifier method or a prediction method. For example, identifying segmented images 412 can be performed using an image classifier, such as K-means methods or Iterative Self-Organizing Data Analysis Technique (ISODATA) methods. The following methods can also be trained to provide object identification capabilities for segmented images: YOLO methods, ResNet methods, VIT methods, a Contrastive Language-Image Pre-Training (CLIP) methods, convolutional neural network (CNN) methods, MobileNet methods, and EfficientNet methods.

For segmented text 410, a two-step process can be used in which optical character recognition is used, e.g., to map a segment with text to an order set of alphanumeric characters (e.g., an ASCII character string of the text), and then a language model is applied to determine the referent or the type referent that is referred to by the text. For example, a natural language processing (NLP) model or large language model (LLM) can be used such as a transformer method, a Generative pre-trained transformers (GPT) method, a Bidirectional Encoder Representations from Transformers (BERT) method, or a T5 method.

The segmented elements (i.e., segmented text 410 and segmented images 412) are received by a products selection processor 416, which compares them to a list of products stored in the products database 414. The products selection processor 416 can search for products in the products database 414 that are similar or related to the identified objects in the segmented images 412 and the referents in the 410, and then recommend those similar products as candidates for the products that are to be promoted in the graphic narrative. An author/editor can receive the automated recommendations and select one or more of the proposed candidates to actually be promoted/featured in the graphic narrative.

The author/editor can also search the products database 414 using keywords or categories for those types of products that are likely to be compatible with the subject matter of the graphic narrative. For example, if the storyline involves a car-chase story arc, then the author/editor might search the products database 414 for fast cars. An automated method can determine likely panels and segmented elements therein that can be modified to promote the selected products. The author/editor can review and edit the proposed panels and segmented elements to select and finalize which of the panels and segmented elements are to be modified to promote the selected products.

The selected elements and products are provided to the modification processor 418, which then generates modified text and or modified images that promote the selected products. The modified segments with the modified text and or modified images then replace the selected elements to generate the modified panels 424. The modified text can be generated using the text modifier 420, which uses one or more generative AI methods to generate new text based on the previous text and the selected product. The generative AI method can be a transformer neural network, such as a GPT method or a BERT method. The resultant text can be presented to an author/editor, who then reviews and/or edits the AI-generated text.

For modified image elements, the image modifier 422 can use one or more generative AI methods to create, based on the original image, a proposed image that features of the product. The generative AI methods can use, e.g., generative adversarial network (GAN) methods, Variational autoencoders (VAEs) methods, Deep Dream methods, Neural Style Transfer methods, and/or Stable Diffusion Generator methods. These can be trained using the author's/illustrator's work product that is in the same style as the graphic narrative to generate modified images that are consistent with and seamlessly integrate with the graphic narrative. The resultant images can be presented to an author/editor, who then reviews and/or edits the AI-generated images.

Then, the modified image elements and modified text elements are integrated into the corresponding panels to provide the modified panels 424. The integration may require further modification in terms of how the modified image element or modified text element is smoothly integrated. In some cases, a modified text element may change the size of a speech bubble, for example, and it may obstruct important features in the respective modified panel. Or in some cases, a modified image element may change a background to include a new billboard however there is a missing shadow.

The modified panels 424 can then be processed by a review and editing processor 426 to generate the finalized panels 428, which are then stored in a content database 430. The review and editing processor 426 may provide an option to add to or change certain elements of the modified text element or modified image element. The review and editing processor 426 may also use one or more generative AI methods to provide such additions or changes.

The finalized panels 428 can include indicia that signal to a viewer which of the panels are interactive, such that interacting with said panels can provide access to an offer for purchasing the promoted product. For example, the interactive panels can have a unique border or other feature that identifies them as being interactive. Interacting with the designated panels can be performed, e.g., by clicking/selecting the panel to access a popup window or a link to a website from which the promoted product can be purchased. In some cases, the designated panels can include a watermark, which may or may not be discernable to the human eye, but can be accessed by imaging the watermark using a camera on a handheld device (e.g., a smartphone camera).

Several versions of the modified graphic narrative can be stored in the content database 430. For example, a first version might promote a first brand of shoes and a second version of the graphic narrative might promote a second brand of shoes. When the viewer database 432 indicates that the viewer of the graphic narrative has shown an interest in purchasing the second brand of shoes, the content selector 434 can select the second version to display to the viewer. Alternatively, a viewer might opt out of viewing a graphic narrative that promotes products, and the content selector 434 can select from the content database 430 a version of the graphic narrative that lacks promoted products. Further, a viewer can select preferences regarding what types of information about the viewer are allowed to be considered when selecting a version of the graphic narrative from the content selector 434.

The rendering processor 438 takes the display images 436 and determines how to render them for a particular device and in a particular user interface (UI) or user experience (UX) that is being used for viewing the display images 436 of the graphic narrative The system 400 can be distributed across multiple computing platforms and devices. For example, units 404, 408, 414, 416, 418, and 426 can be located on a computing system 300 of the author/editor or in a cloud computing environment. Additionally, units 404, 408, 414, 416, and 418 can be located on a computing system 300 of the publisher, and unit 426 can be located on a computing system 300 of the author/illustrator. Further, units 434 and 438 can be located on a viewer's mobile device 316 or in a cloud computing environment.

Figure 5:
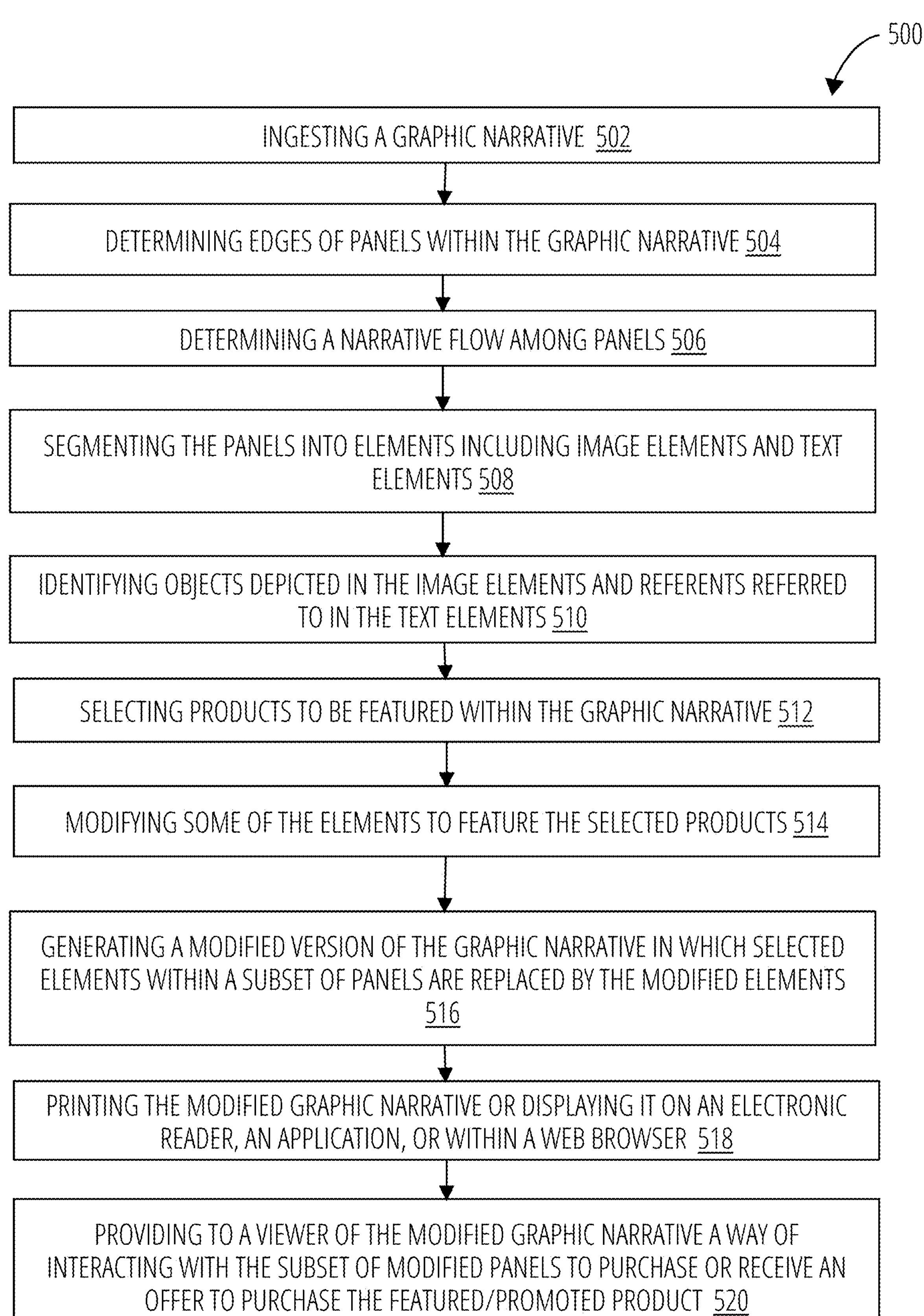
FIG. 5 illustrates an example of a flow diagram for a method of generating the modified graphic narrative, in accordance with some aspects of the present technology.

FIG. 5 illustrates an example method 500 for modifying a graphic narrative to promote one or more products. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to certain non-limiting examples, step 502 of the method includes ingesting a graphic narrative. Step 502 can be performed by the ingestion and flow processor 404 in FIG. 4, for example.

According to certain non-limiting examples, step 504 of the method includes determining edges of panels within the graphic narrative. Step 504 can be performed by the ingestion and flow processor 404 in FIG. 4, for example. The determination of at least three edges may define the parameters of a panel. Each panel may have overlapping edges with other panels.

According to certain non-limiting examples, step 506 of the method includes determining a narrative flow among the panels. Step 506 can be performed by the ingestion and flow processor 404 in FIG. 4, for example.

According to certain non-limiting examples, step 508 of the method includes segmenting the panels into elements including image elements and text elements. Step 508 can be performed by the segmentation processor 408 in FIG. 4, for example. The segmentation can be performed, e.g., using semantic segmentation models (e.g., FCN, U-Net, SegNet, PSPNet, DeepLab, etc) that perform semantic segmentation using an Encoder-Decoder structure or Multi-Scale representation structure, thereby generating distinct segments that correspond to respective elements within each of the panels. Other segmentation models, which are discussed with reference to FIG. 4, can also be used to perform step 508.

The segmented elements can include background, foreground, text bubbles, text blocks, and onomatopoeia, and the background and foreground can be further sub-divided into individual characters, objects, and buildings.

According to certain non-limiting examples, step 510 of the method includes identifying objects depicted in the image elements and referents referred to in the text elements. Step 510 can be performed by the segmentation processor 408 in FIG. 4, for example. Object identification and pattern recognition models, which are discussed with reference to FIG. 4, can be used to perform step 510.

According to certain non-limiting examples, step 512 of the method includes selecting products to be featured or promoted within the graphic narrative. Step 512 can be performed by the products selection processor 416 in FIG. 4, for example. The products eligible to be promoted are stored in the products database 414, and these products can include physical goods, consumables, services, subscriptions, memberships, phone apps, securities, derivatives, and access to offers. The selection of products can be automated, manual, or a combination of automated and manual.

According to certain non-limiting examples, the selection of products to promote can include determining a degree/level of matching between the products stored in the products database 414 and the objects identified in the segmented images 412 or the referents of the segmented text 410. Then, the degree/level of matching can be compared to one or more predefined criteria, and those products that satisfy or exceed the one or more predefined criteria are automatically selected as candidate products for being promoted. Examples of the one or more predefined criteria can include, e.g.: (i) a criterion that a predefined number or percentage of products having the highest degree/level of matching are selected; (ii) a criterion that products having a degree/level of matching that exceeds a predefined threshold are selected; (iii) a criterion that the products be in certain categories that an author has pre-selected as being compatible with the subject matter of the graphic narrative. The predefined thresholds may be based on data corresponding to a predicted viewer base and a comparison of such data with a list of products. For example, if the predicted viewer base are male between the ages of 15-25 and enjoy baseball paraphernalia, a list of products that may pass the respective predefined thresholds may include not only baseball-related products, but also other sports related products, or videogame related products, depending on the respective predefined threshold.

After an automated process to narrow the number of candidate products, the proposed candidate products can be presented to an author/editor of the graphic narrative, who then makes a final selection of which products to promote in the graphic narrative. For example, step 512 can include proposing the automatically selected products to the author/editor of the graphic narrative, and the author/editor performs a final selection of which products to advertise in the graphic narrative.

Additionally, the products selection processor 416 can recommend which panels and which segmented elements within those panels are to be modified to promote the selected products. Then the author/editor can make final decisions about which panels and segmented elements are to be modified to promote the selected products. The products selection processor 416 then received the selections from the author/editor of the graphic narrative indicating which frames and which segmented elements are to be modified.

According to certain non-limiting examples, step 514 of the method includes modifying some of the elements to feature the selected products. Step 514 can be performed by the modification processor 418 in FIG. 4, and use one or more of the generative AI methods disclosed in reference to the modification processor 418. Step 514 can include modifying the selected elements within the selected panels such that the modified elements promote the selected products. For image elements, a GAN method can be used to generate a modified image element that is directed to promoting or featuring a selected product. For text elements, an LLM can be used to transform the original text to modified text that refers to the selected product, and a GAN can be used to render that text in the style/font of the original text element.

According to certain non-limiting examples, step 516 of the method includes generating a modified version of the graphic narrative in which selected elements within a subset of panels are replaced by the modified elements. Step 516 can be performed by the review and editing processor 426 in FIG. 4. The completed version of the modified graphic narrative is generated after the modified panels have been integrated with those panels that remain unchanged, and the entirety has been edited and approved by the author. As discussed above, different sets of products can be promoted in different versions of the modified graphic narrative.

According to certain non-limiting examples, step 518 of the method includes printing the modified graphic narrative or displaying it on an electronic reader, an application, or within a web browser. Step 518 can be performed by renderer 438 in FIG. 4.

According to certain non-limiting examples, step 520 of the method includes providing a viewer of the modified graphic narrative a way of interacting with the subset of modified panels to purchase or receive an offer to purchase the featured/promoted product. Step 520 can include signaling which of the panels include promotions of products and/or include interactive features related to products. For example, said panels can be signaled, e.g., by providing a visual cue or other indicia (such as a different border) that distinguishes said panels from non-promotional or non-interactive panels.

The modified panels can be made interactive by embedding a watermark or a link to a website or popup window. The watermark (e.g., a QR code) can be interacted with by imaging the panel using a camera on a mobile device, which then provides access to a link to a website or popup window, for example. The website or popup window can allow a viewer to purchase the product or would allow the viewer to enter information, such as an email address or a phone number that receives text messages, thereby enabling the user to receive an offer to purchase the product. Alternatively, when the panels are displayed in an e-reader with a touch screen, For example, the viewer can interact with the panels by tapping, clicking, or otherwise selecting the panels or the segmented elements within the panels to access a link to a website, an application store, or a popup window that allows the viewer to purchase the product. Additionally, viewing the panels can enable wireless communication with a user device (e.g., communications using RFID, near field communications (NFC), internet of things (IoT) communications, or BLUETOOTH) to enable the user device to receive a push notification or to access a link for the promoted product.

Figure 6:
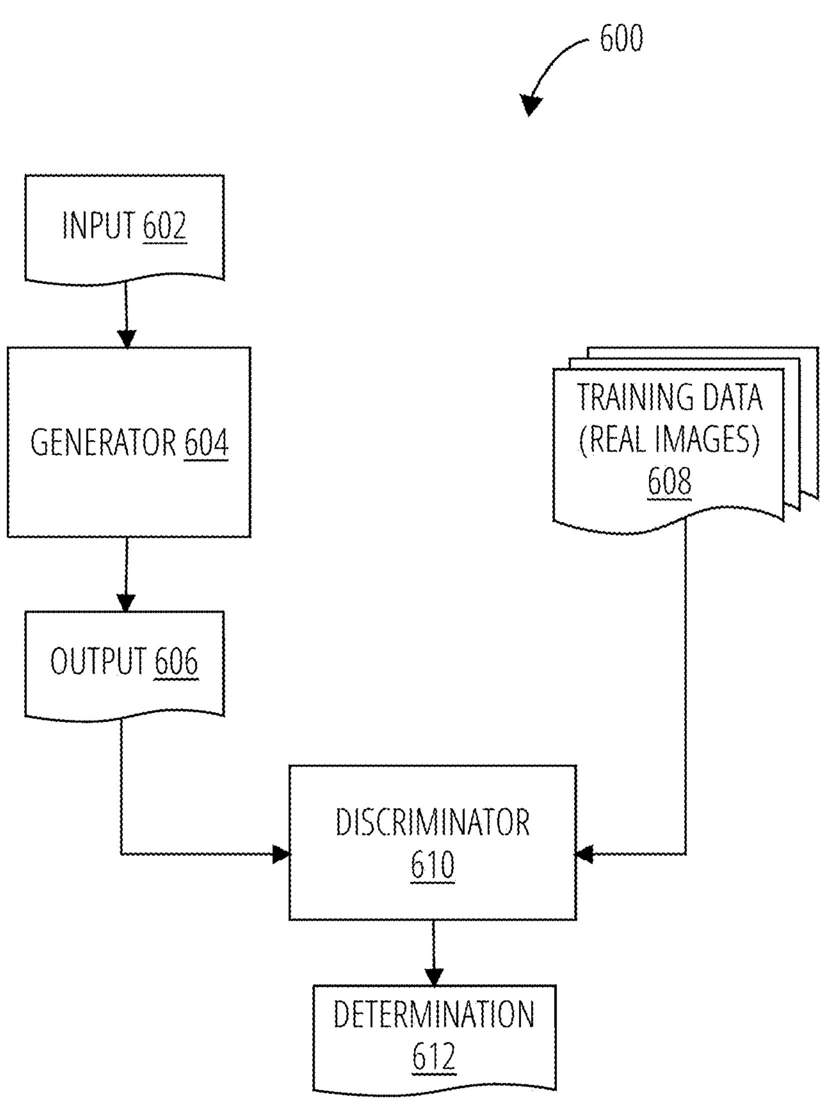
FIG. 6 illustrates an example of a block diagram of training a generative adversarial network (GAN), in accordance with some aspects of the present technology.

FIG. 6 illustrates a GAN architecture 600. The GAN architecture 600 has two parts: the generator 604 and the discriminator 610. The generator 604 learns to generate plausible images. The discriminator 610 learns to distinguish the plausible images of the generator 604 from real images. The discriminator 610 receives two images (i.e., the output 606 from the generator 604 and a real image from the training data 608), and analyzes the two received images to make a determination 612 which is the real image. The generator 604 fools the discriminator 610 when the determination 612 is incorrect regarding which of the images received by the discriminator 610 was real.

Both the generator and the discriminator are neural networks with weights between nodes in respective layers, and these weights are optimized by training against the training data 608, e.g., using backpropagation. The instances when the generator 604 successfully fools the discriminator 610 become negative training examples for the discriminator 610, and the weights of the discriminator 610 are updated using backpropagation. Similarly, the instances when the generator 604 is unsuccessfully in fooling the discriminator 610 become negative training examples for the generator 604, and the weights of the generator 604 are updated using backpropagation.

Figure 7A:
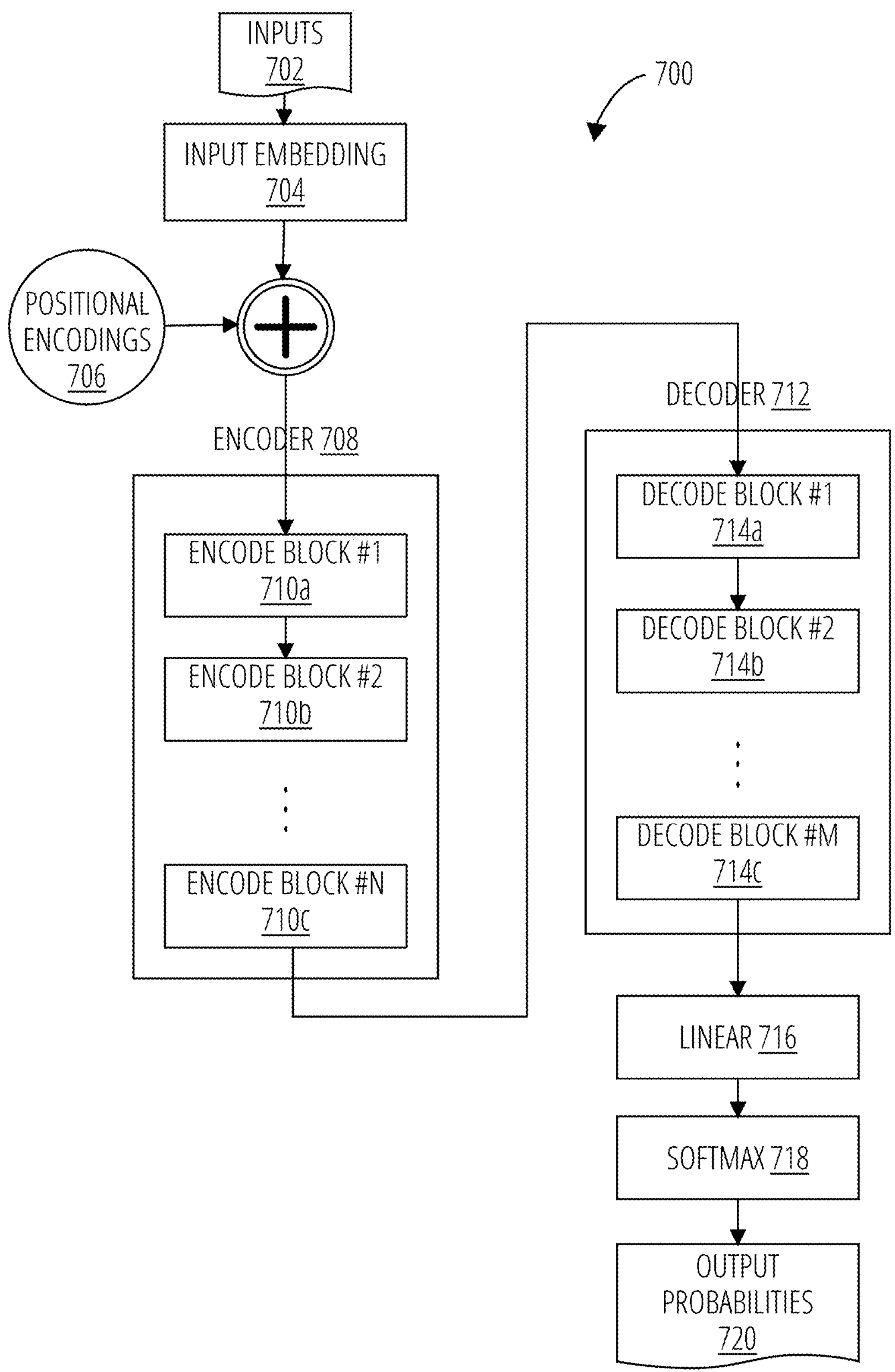
FIG. 7A illustrates an example of a block diagram of a transformer neural, in accordance with some aspects of the present technology.
Figure 7B:
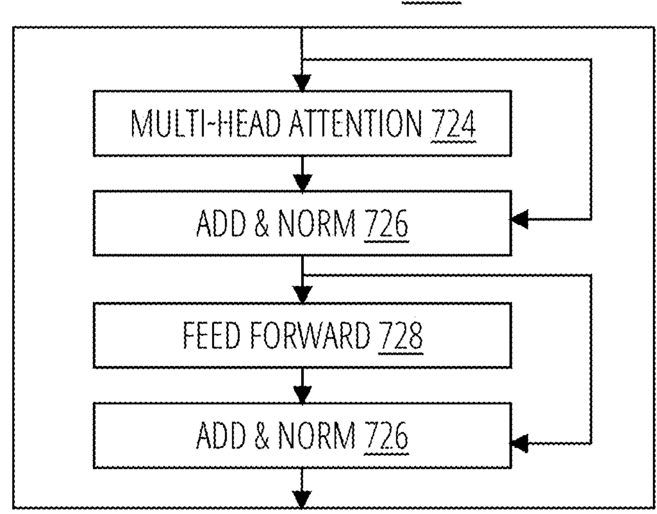
FIG. 7B illustrates an example of a block diagram of an encode block of the transformer neural, in accordance with some aspects of the present technology.
Figure 7C:
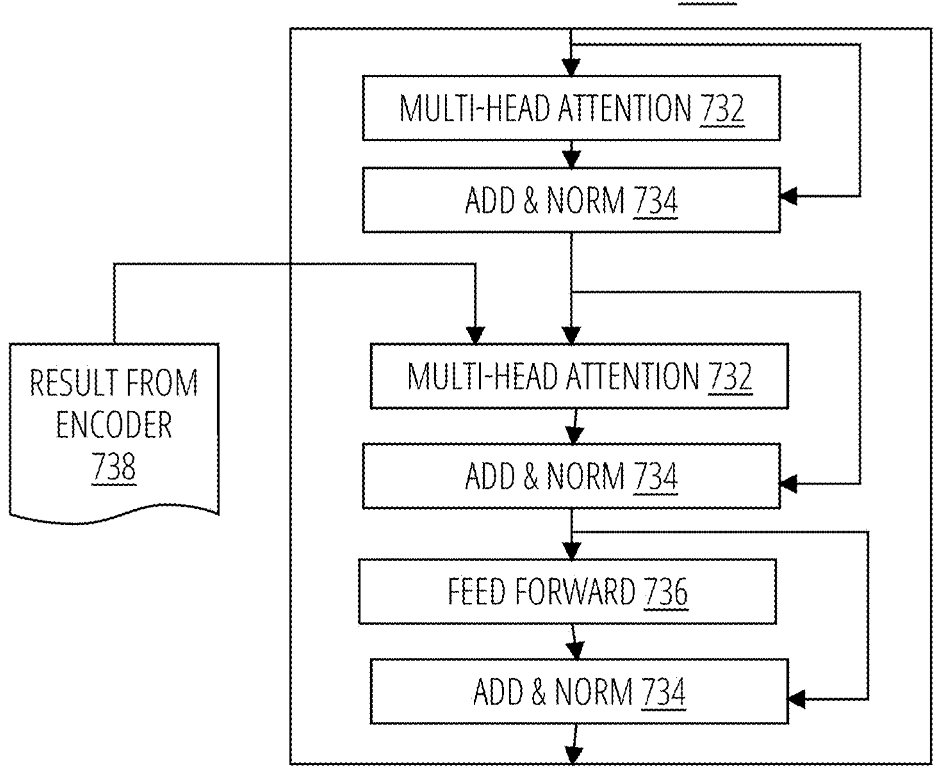
FIG. 7C illustrates an example of a block diagram of an decode block of the transformer neural, in accordance with some aspects of the present technology.

A transformer architecture 700 could be used to interpret and generate text for the modified panels. Examples of transformers include a Bidirectional Encoder Representations from Transformer (BERT) and a Generative Pre-trained Transformer (GPT). The transformer architecture 700, which is illustrated in FIG. 7A through FIG. 7C, includes inputs 702, an input embedding block 704, positional encodings 706, an encoder 708 (e.g., encode blocks 710*a*, 710*b*, and 710*c*), a decoder 712 (e.g., decode blocks 514*a*, 514*b*, and 714*c*), a linear block 716, a softmax block 718, and output probabilities 720.

The inputs 702 can include log files. The transformer architecture 700 is used to determine output probabilities 720 regarding regular expressions, The input embedding block 704 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 704 can be learned embeddings to convert the input tokens and output tokens to vectors of dimension have the same dimension as the positional encodings, for example.

The positional encodings 706 provide information about the relative or absolute position of the tokens in the sequence. According to certain non-limiting examples, the positional encodings 706 can be provided by adding positional encodings to the input embeddings at the inputs to the encoder 708 and decoder 712. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

The encoder 708 uses stacked self-attention and point-wise, fully connected layers. The encoder 708 can be a stack of N identical layers (e.g., N=6), and each layer is an encode block 410, as illustrated by encode block 710*a* shown in FIG. 7B. Each encode block 410 has two sub-layers: (i) a first sub-layer has a multi-head attention encode block 722*a* and (ii) a second sub-layer has a feed forward add & norm block 726, which can be a position-wise fully connected feed-forward network. The feed forward add & norm block 726 can use a rectified linear unit (ReLU).

The encoder 708 uses a residual connection around each of the two sub-layers, followed by an add & norm multi-head attention block 724, which performs normalization (e.g., the output of each sub-layer is LayerNorm (x+Sublayer (x)), i.e., the product of a layer normalization "LayerNorm" time the sum of the input "x" and output "Sublayer (x)" pf the sublayer LayerNorm (x+Sublayer (x)), where Sublayer (x) is the function implemented by the sub-layer). To facilitate these residual connections, all sub-layers in the model, as well as the embedding layers, produce output data having a same dimension.

Similar to the encoder 708, the decoder 712 uses stacked self-attention and point-wise, fully connected layers. The decoder 712 can also be a stack of M identical layers (e.g., M=6), and each layer is a decode block 414, as illustrated by encode decode block 714*a* shown in FIG. 7C. In addition to the two sub-layers (i.e., the sublayer with the multi-head attention encode block 722*a* and the sub-layer with the feed forward add & norm block 726) found in the encode block 710*a*, the decode block 714*a* can include a third sub-layer, which performs multi-head attention over the output of the encoder stack. Similar to the encoder 708, the decoder 712 uses residual connections around each of the sub-layers, followed by layer normalization. Additionally, the sub-layer with the multi-head attention encode block 722*a* can be modified in the decoder stack to prevent positions from attending to subsequent positions. This masking, combined with fact that the output embeddings are offset by one position, ensures that the predictions for position i can depend only on the known output data at positions less than i.

The linear block 716 can be a learned linear transformation. For example, when the transformer architecture 700 is being used to translate from a first language into a second language, the linear block 716 projects the output from the last decode block 714*c* into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 718 then turns the scores from the linear block 716 into output probabilities 720 (which add up to 1.0). In each position, the index provides for the word with the highest probability, and then map that index to the corresponding word in the vocabulary. Those words then form the output sequence of the transformer architecture 700. The softmax operation is applied to the output from the linear block 716 to convert the raw numbers into the output probabilities 720 (e.g., token probabilities).

Figure 8A:
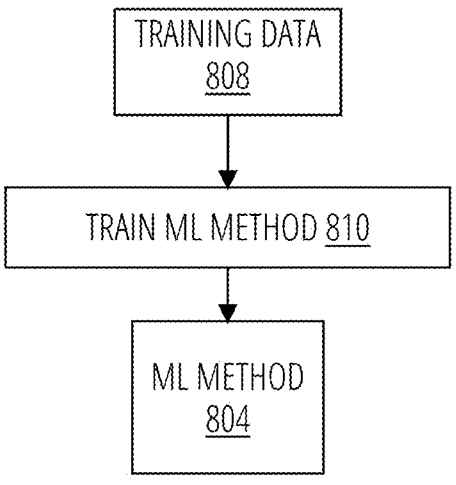
FIG. 8A illustrates an example of a block diagram of training an AI processor to segment/identify/modify elements in the graphic narrative, in accordance with some aspects of the present technology.

FIG. 8A illustrates an example of training an ML method 804. In step 810, training data previous element 802 is applied to train the ML method 804. For example, the ML method 804 can be an artificial neural network (ANN) that is trained via unsupervised or self-supervised learning using a backpropagation technique to train the weighting parameters between nodes within respective layers of the ANN.

An advantage of the GAN architecture 600 and the transformer architecture 700 is that they can be trained through self-supervised learning or unsupervised methods. The Bidirectional Encoder Representations from Transformer (BERT), For example, does much of its training by taking large corpora of unlabeled text, masking parts of it, and trying to predict the missing parts. It then tunes its parameters based on how much its predictions were close to or far from the actual data. By continuously going through this process, the transformer architecture 700 captures the statistical relations between different words in different contexts. After this pretraining phase, the transformer architecture 700 can be finetuned for a downstream task such as question answering, text summarization, or sentiment analysis by training it on a small number of labeled examples.

In unsupervised learning, the training data 808 is applied as an input to the ML method 804, and an error/loss function is generated by comparing the predictions of the next word in a text from the ML method 804 with the actual word in the text. The coefficients of the ML method 804 can be iteratively updated to reduce an error/loss function. The value of the error/loss function decreases as outputs from the ML method 804 increasingly approximate the training data 808.

For example, in certain implementations, the cost function can use the mean-squared error to minimize the average squared error. In the case of a multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods and particle swarm optimization, can also be used for training the ML method 804.

The training 810 of the ML method 804 can also include various techniques to prevent overfitting to the training data 808 and for validating the trained ML method 804. For example, bootstrapping and random sampling of the training data 808 can be used during training.

In addition to supervised learning used to initially train the ML method 804, the ML method 804 can be continuously trained while being used by using reinforcement learning.

Further, other machine learning (ML) algorithms can be used for the ML method 804, and the ML method 804 is not limited to being an ANN. For example, there are many machine-learning models, and the ML method 804 can be based on machine learning systems that include generative adversarial networks (GANs) that are trained, For example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 8B:
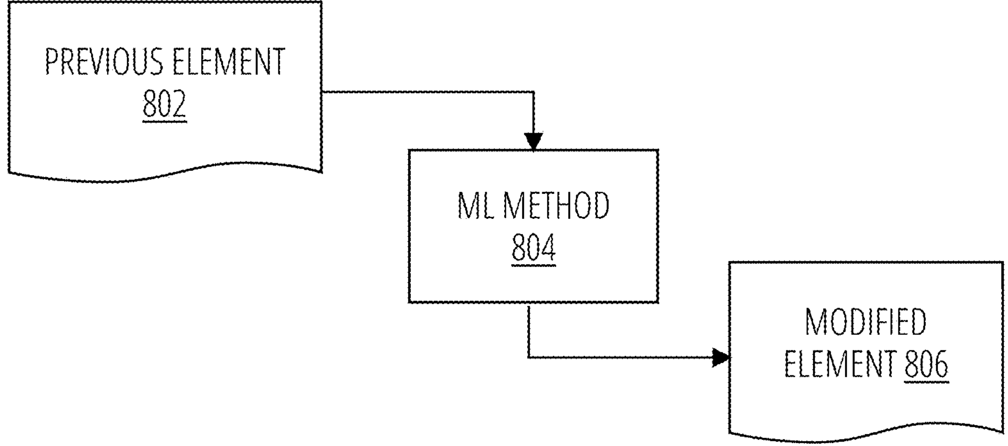
FIG. 8B illustrates an example of a block diagram for using a trained AI processor to segment/identify/modify elements in the graphic narrative, in accordance with some aspects of the present technology.

FIG. 8B illustrates an example of using the trained ML method 804. The previous element 802 and/or instructions for modifying the previous element 802 are applied as inputs to the trained ML method 804 to generate the outputs, which can include the modified element 806.

Figure 9:
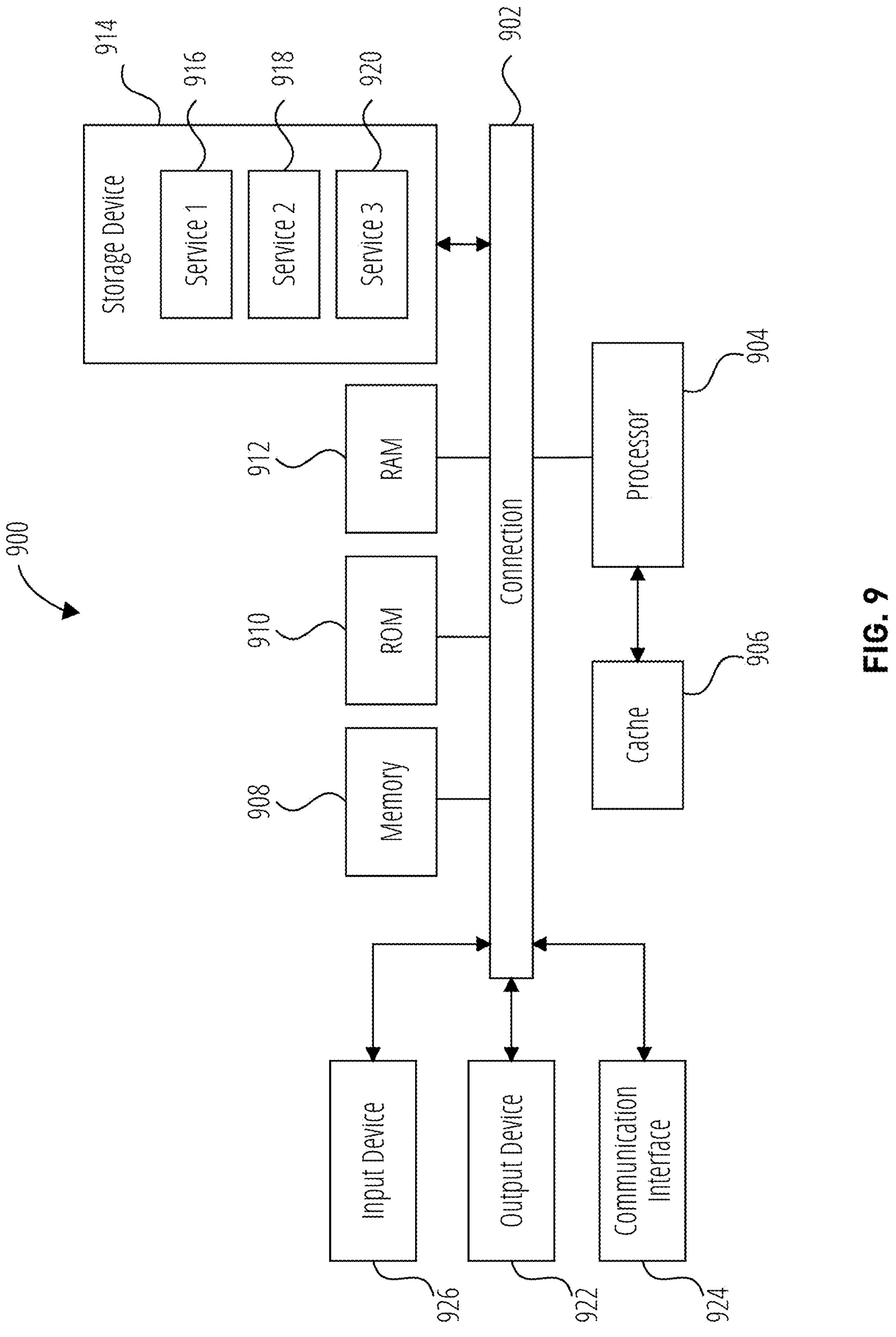
FIG. 9 illustrates an example of a block diagram of a computing device, in accordance with some aspects of the present technology.

FIG. 9 shows an example of computing system 900. The computing system 900 can be the computing system 300 or the mobile device 316. The computing system 900 can perform the functions of one or more of the units in the system 400 and can be used to perform one or more of the steps of method 500. The computing system 900 can be part of a distributed computing network in which several computers perform respective steps in method 500 and/or the functions of units in system 400. The computing system 900 can be connected to the other parts of the distributed computing network via the connection 902 or the communication interface 924. Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 and connection 902 that couples various system components including system memory 908, such as read-only memory (ROM) 808 and random access memory (RAM) 810 to processor 904. Computing system 900 can include a cache of high-speed memory 706 connected directly with, in close proximity to, or integrated as part of processor 904. Processor 904 may essentially be a completely self-contained computing system, containing multiple cores or processors, a bus, memory controller, cache, etc. A multi-core processor may be symmetric or asymmetric.

Processor 904 can include any general purpose processor and a hardware service or software service, such as services 916, 918, and 720 stored in storage device 914, configured to control processor 904 as well as a special-purpose processor where software instructions are incorporated into the actual processor design. Service 1 916 can be identifying the extent of a flow between the respective panels, for example. Service 2 918 can include segmenting the each of the panels into segmented elements (e.g., background, foreground, characters, objects, text bubbles, text blocks, etc.) and identifying the content of the each of the segmented elements. Service 3 920 can be identifying candidate products to be promoted in the segmented elements, and then selecting from among the candidate products and segmented elements which elements are to be modified to promote which selected products. Additional services that are not shown can include modifying the selected elements to promote the selected products, and integrating the modified elements into the graphic narrative.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include a communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a system 400 and perform one or more functions of the method 500 when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be. For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As discussed above, the methods and systems disclosed herein can provide a transformative technology that integrates advertising within the medium of online, digital, and printed graphic narratives (e.g., comic books). According to certain non-limiting examples, the methods and systems disclosed herein can be referred to as "Dynamic Interactive Contextual Advertising" (DICA). Said methods and systems leverage recent and ongoing advances in real-time data processing, inventory management, and personalization algorithms to augment the advertising experience and streamline consumer-merchant interactions.

According to certain non-limiting examples, the systems disclosed herein intelligently insert advertisements into comic book narratives by transforming real-life products into contextual elements within the frame. The real-life products can be selected from a comprehensive database, rendered in the style of the author/artist of the comic book and then rendered as contextual elements within the frame. Thus, the methods and systems disclosed herein enable the seamless integration of products into the storyline, either by replacing existing items in the scene or introducing new ones. These advertisements, rather than being obtrusive, enhance the visual narrative by offering a native advertising experience.

According to certain non-limiting examples, the methods and systems disclosed herein can provide an interactive experience for viewers. For example, when a viewer interacts with digitally embedded product placements, whether through a click or a touch. When the viewer interacts with digitally embedded product placements, a pop-up information bubble can appear, for example. The pop-up information bubble can detail the product's features, price, and an instant purchase option. The viewer can then explore and purchase the item directly from the comic interface without any need to navigate away, creating a seamless purchasing experience.

Moreover, the methods and systems disclosed herein offer unique capabilities to manage advance purchases, providing a robust tool for retailers. For example, the methods and systems disclosed herein can aggregate these pre-orders in real time, enabling them to anticipate demand, optimally manage inventory, and facilitate print-on-demand services.

According to certain non-limiting examples, the methods and systems disclosed herein can personalize each viewer's advertising experience. For example, the methods and systems disclosed herein can use algorithms to analyze the consumer's historical data, interests, and preferences, and based on the analysis of this information, the methods and systems disclosed herein can adapt the embedded advertising accordingly. This targeted approach ensures that each viewer encounters a unique native advertising experience, potentially different from every other viewer. Thus, the methods and systems disclosed herein can offer an innovative convergence of technology and graphic narrative artistry, and thereby provide a more interactive and engaging advertising experience while fostering efficient real-time inventory management.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, For example, instructions and data which cause or otherwise configure a general purpose computer, special purpose computer, or special purpose processing device to perform a certain function or group of functions. Portions of computer resources used can be accessible over a network. The computer executable instructions may be, For example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of modifying digital graphic narrative files, the method comprising:

segmenting elements within panels of one of the graphic narrative files;

selecting one or more products to be featured at selected elements of the segmented elements, wherein the selected elements are within a subset of the panels; and generating a modified version of the graphic narrative file in which the selected elements within the subset of the panels have been replaced by modified elements that have been modified to feature the selected products, wherein additional content regarding the selected products is accessible using one or more links that are selectable by a viewer device based on:

selecting a region associated with one or more of the modified elements;

pointing an associated camera to image a watermark or QR code embedded in one of the panels of the subset of the panels; or signaling a push notification that includes at least one of the links.

2. The method of claim 1, further comprising:

ingesting a plurality of pages of the graphic narrative file; and slicing the pages into the panels based on edges determined for the panels.

3. The method of claim 1, further comprising:

analyzing the segmented elements to identify objects depicted in illustration elements and determine referents of text elements;

determining candidate products from among a plurality of products based on one or more product criteria and a degree of matching associating the candidate products with one or more of the identified objects and the determined referents; and selecting the products to be featured from among the candidate products.

4. The method of claim 3, wherein selecting the products to be featured is further based on instructions from one or more of an author, illustrator, editor, or publisher of the graphic narrative file regarding the candidate products.

5. The method of claim 3, wherein determining the candidate products is further based on one or more preferences of an author, illustrator, editor, or publisher of the graphic narrative file, wherein the product criteria includes the preferences.

6. The method of claim 1, wherein segmenting the elements within the panels further comprises applying a first machine learning (ML) model to a panel of the panels to identify bounded regions corresponding to one or more of background, foreground, text bubbles, objects, and characters, and wherein the bounded regions are identified as the segmented elements.

7. The method of claim 6, wherein the first ML model is trained to perform semantic segmentation in accordance with one or more of a Fully Convolutional Network (FCN) method, a U-Net method, a SegNet method, a Pyramid Scene Parsing Network (PSPNet) method, a DeepLab method, a Mask R-CNN, an Object Detection and Segmentation method, a fast R-CNN method, a faster R-CNN method, a You Only Look Once (YOLO) method, a PASCAL VOC method, a COCO method, a ILSVRC method, a Single Shot Detection (SSD) method, a Single Shot MultiBox Detector method, and a Vision Transformer (ViT) method.

8. The method of claim 3, wherein analyzing the segmented elements further comprises one or more of:

applying an image classifier to identify a type of an object illustrated within at least one of the illustration elements; and applying a character recognition or language model to determine text of at least one of the text elements and to determine one or more of the referents of the text.

9. The method of claim 8, wherein the image classifier includes one or more of a K-means method, an Iterative Self-Organizing Data Analysis Technique (ISODATA) method, a YOLO method, A ResNet method, a ViT method, a Contrastive Language-Image Pre-Training (CLIP) method, a convolutional neural network (CNN) method, a MobileNet method, and an EfficientNet method, and wherein the language model includes one or more of a transformer method, a Generative pre-trained transformers (GPT), a Bidirectional Encoder Representations from Transformers (BERT) method, and a T5 method.

10. The method of claim 3, wherein determining the candidate products further comprises:

determining a score representing a semantic similarity between the candidate product and one or more of the identified objects or the referents; and generating a degree of matching based on the score.

11. The method of claim 1, further comprising modifying the subset of the panels to signal the links to the additional content associated with the selected products.

12. A method of providing product content within digital graphic narrative files, the method comprising:

parsing elements within respective panels of one of the graphic narrative files;

determining candidate products among the parsed elements based on a degree of matching between the parsed elements and content associated with products stored in a stored list of products;

selecting one or more products from among the candidate products; and modifying one or more selected elements to include the content associated with the selected products, the content accessible using one or more links that are selectable by a viewer device based on:

selecting a region associated with one or more of the selected elements;

pointing an associated camera to image a watermark or QR code embedded in one of the selected elements; or signaling a push notification that includes at least one of the links.

13. A computing apparatus for modifying digital graphic narrative files, the apparatus comprising:

one or more processors; and a memory storing instructions that, when executed by the one or more processors, configure the apparatus to:

segment elements within panels of one of the graphic narrative files;

select one or more products to be featured at selected elements of the segmented elements, wherein the selected elements are within a subset of the panels;

generate a modified version of the graphic narrative file in which the selected elements within the subset of the panels have been replaced by modified elements that have been modified to feature the selected one or more products; and modify the subset of the panels that have the modified elements to indicate one or more links selectable by a viewer device to access additional content regarding the selected products, wherein at least one of the links are selectable by a viewer device based on:

selecting a region associated with one or more of the modified elements;

pointing an associated camera to image a watermark or QR code embedded in one of the panels of the subset of the panels; or signaling a push notification that includes at least one of the links.

14. The computing apparatus of claim 13, wherein the processors execute further instructions to:

ingest a plurality of pages of the graphic narrative file; and slice the pages into the panels based on edges determined for the panels.

15. The computing apparatus of claim 13, wherein the processors execute further instructions to:

analyze the segmented elements to identify objects depicted in illustration elements and determine referents of text elements;

determine candidate products from among a plurality of products based on one or more product criteria and a degree of matching associating the candidate products with one or more of the identified objects and the determined referents; and select the products to be featured from among the candidate products.

16. The computing apparatus of claim 13, wherein the processors segment the elements by applying a first machine learning (ML) model to a panel of the panels to identify bounded regions corresponding to one or more of a background, a foreground, text bubbles, objects, and characters, and wherein the bounded regions are identified as the segmented elements.

17. The computing apparatus of claim 15, wherein the processors analyze the segmented elements by performing one or more of:

applying an image classifier to identify a type of an object illustrated within at least one of the illustration elements; and applying a character recognition or language model to determine text of at least one of the text elements and to determine one or more of the referents of the text.

18. The computing apparatus of claim 17, wherein the image classifier includes one or more of a K-means method, an Iterative Self-Organizing Data Analysis Technique (ISODATA) method, a YOLO method, A ResNet method, a ViT method, a Contrastive Language-Image Pre-Training (CLIP) method, a convolutional neural network (CNN) method, a MobileNet method, and an EfficientNet method, and wherein the language model is selected from the group consisting of a transformer method, a Generative pre-trained transformers (GPT), a Bidirectional Encoder Representations from Transformers (BERT) method, and a T5 method.

19. A non-transitory computer-readable storage medium including instructions that when executed by a computer, cause the computer to:

segment elements within panels of one of the graphic narrative files;

select one or more products to be featured at selected elements of the segmented elements, wherein the selected elements are within a subset of the panels; and generate a modified version of the graphic narrative file in which the selected elements within the subset of the panels have been replaced by modified elements that have been modified to feature the selected products, wherein additional content regarding the selected products is accessible using one or more links that are selectable by a viewer device based on:

selecting a region associated with one or more of the modified elements;

pointing an associated camera to image a watermark or QR code embedded in one of the panels of the subset of the panels; or signaling a push notification that includes at least one of the links.

* * * * *